US012786800B1

(12) United States Patent
Pratt et al.

(10) Patent No.: US 12,786,800 B1
(45) Date of Patent: Nov. 3, 2026

(54) SYSTEMS AND METHODS FOR PROVIDING WIRELESS COMMUNICATION SERVICE

(71) Applicant: Cable Television Laboratories, Inc., Louisville, CO (US)

(72) Inventors: Craig M. Pratt, Portland, OR (US); Darshak Thakore, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 309 days.

(21) Appl. No.: 18/449,619

(22) Filed: Aug. 14, 2023

Related U.S. Application Data

(63) Continuation-in-part of application No. 17/592,317, filed on Feb. 3, 2022, now Pat. No. 12,238,517.

(60) Provisional application No. 63/404,297, filed on Sep. 7, 2022, provisional application No. 63/397,509, filed on Aug. 12, 2022, provisional application No. 63/240,498, filed on Sep. 3, 2021, provisional application No. 63/145,165, filed on Feb. 3, 2021.

(51) Int. Cl.
*H04W 28/20* (2009.01)

(52) U.S. Cl.
CPC .................................. *H04W 28/20* (2013.01)

(58) Field of Classification Search
CPC ... H04W 28/20; H04W 28/086; H04W 84/12; H04W 48/08
USPC .......................................................... 370/229
See application file for complete search history.

(56) References Cited

U.S. PATENT DOCUMENTS

| | | | |
|---|---|---|---|
| 6,996,714 | B1 | 2/2006 | Halasz et al. |
| 7,484,008 | B1 | 1/2009 | Gelvin et al. |
| 7,890,612 | B2 | 2/2011 | Todd et al. |
| 8,068,507 | B2 | 11/2011 | Roy |
| 8,122,249 | B2 | 2/2012 | Falk et al. |
| 8,982,908 | B1 | 3/2015 | Shukla et al. |
| 9,027,138 | B2 | 5/2015 | Glenn et al. |
| 9,215,075 | B1 | 12/2015 | Poltorak |

(Continued)

FOREIGN PATENT DOCUMENTS

| | | | | | |
|---|---|---|---|---|---|
| CN | 108541019 | A | * | 9/2018 | H04L 47/805 |
| KR | 20170069759 | A | * | 6/2017 | H04W 80/10 |
| WO | 2018015425 | A1 | | 1/2018 | |

OTHER PUBLICATIONS

Boussard et al., 2015 IEEE, 27th International Teletraffic Congress, "Software-Defined LANs for Interconnected Smart Environments", pp. 219-227 (Year: 2015).

(Continued)

*Primary Examiner* — Chi Tang P Cheng
*Assistant Examiner* — Michael Wayne Maddox
(74) *Attorney, Agent, or Firm* — PdZ Patent Law, PLLC

(57) ABSTRACT

A method for selectively limiting communication bandwidth in a communication environment including at least a first wireless access point includes (1) receiving, from the first wireless access point, a first load information message, (2) determining, from the first load information message, that a data transmission bandwidth limit is needed by the first wireless access point, (3) in response to determining that the data transmission bandwidth limit is needed by the first wireless access point, generating a first data transmission bandwidth limit, and (4) sending the first data transmission bandwidth limit to the first wireless access point.

11 Claims, 10 Drawing Sheets

(56) References Cited

U.S. PATENT DOCUMENTS 9,252,972 B1 2/2016 Dukes et al.
9,342,661 B2 5/2016 Cholas et al.
9,419,842 B1 8/2016 Galliher, III et al.
9,473,925 B2 10/2016 Hanson et al.
9,531,835 B2 12/2016 Wynn et al.
9,686,199 B2 6/2017 Anand
10,404,752 B2 9/2019 Apsangi et al.
10,659,375 B2 * 5/2020 Meredith ............ H04W 28/086
10,708,121 B2 7/2020 Lee et al.
10,749,796 B2 8/2020 Dowlatkhah et al.
11,244,561 B1 2/2022 Fuchs et al.
11,284,258 B1 3/2022 Wei et al.
11,533,341 B2 12/2022 Sood et al.
11,671,829 B1 6/2023 Radhakrishnan et al.
11,683,687 B2 6/2023 Myers et al.
11,689,524 B2 6/2023 Arora et al.
11,693,946 B2 7/2023 Bradley et al.
11,777,917 B2 10/2023 Erickson et al.
12,407,672 B1 9/2025 Goeringer et al.
2003/0009539 A1 1/2003 Hattori
2003/0126233 A1 7/2003 Bryers et al.
2004/0019786 A1 1/2004 Zorn et al.
2006/0209857 A1 9/2006 Hicks
2007/0127428 A1 6/2007 Lee et al.
2007/0234419 A1 10/2007 Shouno
2008/0229399 A1 9/2008 O'Neil et al.
2008/0253550 A1 10/2008 Ch'ng et al.
2010/0057485 A1 3/2010 Luft
2010/0067506 A1 3/2010 Denteneer et al.
2010/0100930 A1 4/2010 King
2010/0235514 A1 9/2010 Beachem
2010/0262988 A1 10/2010 Bauer et al.
2011/0143757 A1 6/2011 Oh et al.
2011/0196837 A1 8/2011 Savunen et al.
2011/0216709 A1 9/2011 Noldus
2011/0302248 A1 12/2011 Garrett et al.
2012/0051341 A1 3/2012 Ong et al.
2012/0100854 A1 * 4/2012 Hanaoka ........... H04W 72/0453
455/450
2012/0173356 A1 7/2012 Fan et al.
2012/0174212 A1 7/2012 Dart et al.
2012/0210001 A1 8/2012 Ryerson et al.
2012/0224484 A1 * 9/2012 Babiarz ............... H04L 41/5019
370/235
2012/0297470 A1 11/2012 Kwon
2013/0064188 A1 3/2013 Tseng et al.
2013/0111550 A1 5/2013 Naveh et al.
2013/0268999 A1 10/2013 Kiang et al.
2014/0068261 A1 3/2014 Malek et al.
2014/0123211 A1 5/2014 Wanser et al.
2014/0162629 A1 6/2014 Tipton et al.
2014/0281029 A1 9/2014 Danforth
2014/0283120 A1 9/2014 Mao et al.
2014/0288949 A1 9/2014 Eromo
2014/0289515 A1 9/2014 Sorotokin et al.
2015/0100329 A1 4/2015 Dreyfuss et al.
2015/0140957 A1 5/2015 Kiswani et al.
2015/0148020 A1 5/2015 Laden et al.
2015/0229619 A1 8/2015 Costa et al.
2015/0249548 A1 9/2015 Rasband et al.
2015/0347769 A1 12/2015 Espinosa et al.
2016/0134488 A1 5/2016 Straub et al.
2016/0192184 A1 6/2016 Salihi
2016/0203352 A1 7/2016 Marsico
2016/0234213 A1 8/2016 Kim et al.
2016/0350095 A1 12/2016 Ramachandran et al.
2016/0373319 A1 12/2016 Littlejohn et al.
2017/0048700 A1 2/2017 Huang et al.
2017/0111826 A1 * 4/2017 Sankar .................. H04W 28/20
2017/0150362 A1 5/2017 Clemenson et al.
2017/0308395 A1 10/2017 Cook et al.
2017/0311368 A1 10/2017 Kandur Raja et al.
2018/0024537 A1 1/2018 Chauvet et al.
2018/0034817 A1 2/2018 Milton et al.
2018/0077067 A1 3/2018 Dowlatkhah et al.
2018/0123932 A1 5/2018 Shaw et al.
2018/0241684 A1 * 8/2018 Meredith ............ H04L 43/0858
2018/0302408 A1 10/2018 Touati et al.
2018/0316730 A1 11/2018 Schaefer et al.
2019/0021125 A1 1/2019 Bischinger
2019/0149987 A1 5/2019 Moore
2019/0166013 A1 * 5/2019 Shaikh .................... H04L 45/64
2019/0182663 A1 6/2019 Wang
2019/0235890 A1 8/2019 Schnoor et al.
2019/0245748 A1 8/2019 Gandhewar et al.
2019/0268762 A1 8/2019 Bestermann et al.
2020/0045519 A1 2/2020 Raleigh et al.
2020/0162917 A1 5/2020 Anantha et al.
2020/0336316 A1 10/2020 Jain et al.
2020/0389869 A1 * 12/2020 Patil .................... H04L 63/0823
2020/0394332 A1 12/2020 Jakobsson et al.
2021/0076216 A1 3/2021 Hotchkiss et al.
2021/0144517 A1 5/2021 Bernat et al.
2021/0298095 A1 9/2021 Ergen et al.
2021/0400485 A1 12/2021 Ergen et al.
2022/0027504 A1 1/2022 Vom et al.
2022/0046521 A1 2/2022 Ghessassi
2022/0109988 A1 4/2022 Kotay et al.
2022/0132510 A1 * 4/2022 Kahn .................... H04W 72/53
2022/0286917 A1 * 9/2022 Yeatts ............... H04M 15/8016
2022/0394603 A1 12/2022 Majumdar et al.
2023/0025898 A1 1/2023 Kaplan et al.
2023/0122711 A1 4/2023 Sun et al.
2023/0141055 A1 5/2023 Kim et al.
2023/0344626 A1 10/2023 Zhao
2023/0354018 A1 11/2023 Carmel-Veilleux et al.
2024/0345208 A1 10/2024 Beg et al.

OTHER PUBLICATIONS

Lamb et al., IEEE 2014, 6th International workshop, "Towards Robust Trust in Software Defined Networks," pp. 166-171 (Year: 2014).
U.S. Appl. No. 17/592,356, filed Feb. 3, 2022, Brian Alexander Scriber.
Ahearne et al., "Software Defined Control of Tunable Optical Transceivers using NETCONF and YANG", 2018 European Conference on Networks and Communications (EuCNC): Network Softwarisation (NET) pp. 81-86 (Year: 2018).
Bifulco et al., "A practical experience in designing an OpenFlow controller", 2012 European Workshop on Software Defined Networking, pp. 61-66 (Year: 2012).
Karmakar et al., "On the Design and Implementation of a Security Architecture for End to End Services in Software Defined Networks," 2016 IEEE 41st Conference on Local Computer Networks, pp. 519-522 (Year: 2016).
Medved et al., "OpenDaylight: Towards a Model-Driven SDN Controller Architecture", IEEE Conferences [ Jun. 1, 2014] Proceeding of IEEE International Symposium on a World of Wireless, Mobile and Multimedia Networks 2014 (pp. 1-6) (Year: 2014).
Nguyen et al., "Software-defined model for IoT clusters: enabling applications on demand", 2018 IEEE, pp. 776-781 (Year: 2018).
U.S. Appl. No. 18/130,377, filed Apr. 3, 2023, John C. Bahr.
U.S. Appl. No. 18/449,619, filed Aug. 14, 2023, Craig Pratt.
Namal et al., IEEE 2014 Eighth International Conference on Next Generation Mobile Applications, Services and Technologies, SDN Core for Mobility Between Cognitive Radio and 802.11 Networks, pp. 272-281 (Year: 2014).
Behrad et al., 2019 IEEE, 22nd Conference on Innovation in Clouds, Internet and Networks, "Network Access Control for the IoT: A Comparison Between Cellular, Wi-Fi and LoRaWAN," pp. 195-200 (Year: 2019).
Lampropoulos et al., 2011 IEEE, "Identity Management Directions in Future Internet," pp. 74-83 (Year: 2011).
Li et al., 2015 IEEE, "Software-Defined Network Function Virtualization: A survey," pp. 2542-2553 (Year: 2015).
Taha Ali et al., 2015 IEEE, Transactions of Reliability, "A Survey of Securing Networks Using Software Defined Networking," pp. 1086-1097 (Year: 2015).

(56) References Cited

OTHER PUBLICATIONS

Connectivity Standards Alliance, Matter 1.0 Core Specification, Version 1.0, Sep. 28, 2022 (Year: 2022).
Goeringer, Steve, 10G Technology: Cable Labs Micronets. https://www.cablelabs.com/micronets. (The Appendix to this document contains a brief overview.).
MIT. Kerberos Articles and Documentation. https://web.mit.edu/kerberos/papers.html. (retrieved on Jun. 27, 2023).
National Domestic Communications Assistance Center. Lawful Intercept Standards.https://ndcac.fbi.gov/calea/lawful-intercept-standards. (Retrieved on Jun. 28, 2023).
Open Networking Foundation. "SDN Architecture for Transport Networks" ONF TR-522; Mar. 15, 2016.
Nabil Bitar, 2014 IEEE Optical Society of America, "Software Defined Networking and Applicability to Access Networks" (Year: 2014).
U.S. Appl. No. 17/592,356, filed Feb. 3, 2022.
U.S. Appl. No. 18/123,814, filed Mar. 20, 2023.
U.S. Appl. No. 18/130,377, filed Apr. 3, 2023.

* cited by examiner

SYSTEMS AND METHODS FOR PROVIDING WIRELESS COMMUNICATION SERVICE

CROSS REFERENCE TO RELATED APPLICATIONS

This application is a continuation in part of U.S. patent application Ser. No. 17/592,317, filed on Feb. 3, 2022, which claims the benefit of and priority to U.S. Provisional Patent Application No. 63/240,498, filed Sep. 3, 2021, and to U.S. Provisional Patent Application No. 63/145,165, filed Feb. 3, 2021. This application also claims benefit of priority to each of U.S. Provisional Patent Application No. 63/397,509, filed on Aug. 12, 2022, and U.S. Provisional Patent Application No. 63/404,297, filed on Sep. 7, 2022. Each of the aforementioned patent applications is hereby incorporated by reference in its entirety.

BACKGROUND

The field of the invention relates generally to managing computer networks, such as to systems and methods for on-boarding new devices and systems and methods for managing resource allocation for devices on a network.

Traditionally, network services have been set-up to allocate resources and provide connection to devices to the IP address associated with the device. However, there are certain underserved/unserved markets where a traditional product deployment model does not suit or scale. The issues range from the limits on average revenue per user (ARPU) to constraints and physical considerations for being able to deliver service to each customer. The market segment classified as Class C & D deployments are for residences that have multi-dwelling unit-style, or a single-unit cluster layout and the goal is to be able to deliver a viable internet service without requiring a customer premises equipment (CPE) for each subscriber. Furthermore, in many areas, the infrastructure may not be capable of supporting running fiber or optical cables to every dwelling. In addition, most devices connect to networks via Wi-Fi as devices with cellular connections can be expensive.

In some situations, different devices connected through the same access point (AP) may require or support different connection attributes. Accordingly, it would be useful for different devices to be able to connect to the same AP using different connection attributes based on subscriptions or other account management features associated with the device.

BRIEF DESCRIPTION

In a first aspect, a system for micro-segmented networking is provided. The system includes a system controller including at least one processor in communication with at least one memory device. The system controller is in communication with a wireless network. The system controller is programmed to store a plurality of micro-segmented network accounts and a plurality of subscriber accounts. Each subscriber account of the plurality of subscriber accounts is associated with a micro-segmented network of the plurality of micro-segmented network accounts. The system controller is also programmed to receive a request from a user device to activate a first micro-segmented network associated with a first subscriber account. The request includes subscriber information associated with the first subscriber account. The system controller is further programmed to authenticate the first subscriber account based on the subscriber information. In addition, the system controller is programmed to activate the first micro-segmented network, including a plurality of device slots for a plurality of devices, Moreover, the system controller is programmed to transmit, to the user device, first device slot authentication information for a first device slot of the plurality of device slots. Furthermore, the system controller is programmed to receive, from a first device connecting to the wireless network, the first device slot authentication information. Additionally, the system controller is programmed to authenticate the first device slot authentication information. In response to authenticating the first device slot authentication information, the system controller is programmed to connect the first device to the first micro-segmented network.

In a second aspect, a method for micro-segmented networking is provided. The method is implemented by a computer device comprising at least one processor in communication with at least one memory device. The computer device is in communication with a wireless network. The method includes storing a plurality of micro-segmented network accounts and a plurality of subscriber accounts. Each subscriber account of the plurality of subscriber accounts is associated with a micro-segmented network of the plurality of micro-segmented network accounts. The method also includes receiving a request from a user device to activate a first micro-segmented network associated with a first subscriber account. The request includes subscriber information associated with the first subscriber account. The method further includes authenticating the first subscriber account based on the subscriber information. In addition, the method includes activating the first micro-segmented network, including a plurality of device slots for a plurality of devices. Moreover, the method includes transmitting, to the user device, first device slot authentication information for a first device slot of the plurality of device slots. Furthermore, the method includes receiving, from a first device connecting to the wireless network, the first device slot authentication information. Additionally, the method includes authenticating the first device slot authentication information. In response to authenticating the first device slot authentication information, the method includes connecting the first device to the first micro-segmented network.

In a third aspect, a method for selectively limiting communication bandwidth in a communication environment including at least a first wireless access point includes (1) receiving, from the first wireless access point, a first load information message, (2) determining, from the first load information message, that a data transmission bandwidth limit is needed by the first wireless access point, (3) in response to determining that the data transmission bandwidth limit is needed by the first wireless access point, generating a first data transmission bandwidth limit, and (4) sending the first data transmission bandwidth limit to the first wireless access point.

In an embodiment of the third aspect, the first data transmission bandwidth limit applies solely to data transmission between the first wireless access point and a single device.

In another embodiment of the third aspect, the first wireless access point serves one or more respective devices of each of at least a first trust domain and a second trust domain, and the first data transmission bandwidth limit applies solely to data transmission between the first wireless access point and the one or more respective devices of the first trust domain.

In another embodiment of the third aspect, the communication environment further includes a second wireless access point, and each of the first wireless access point and the second wireless access point is communicatively coupled to a network element of the communication environment by a respective communication link.

In another embodiment of the third aspect, the first wireless access point is capable of exchanging data with a network element of the communication environment without the data passing through another wireless access point of the communication environment.

In another embodiment of the third aspect, the network element of the communication environment includes a gateway.

In another embodiment of the third aspect, determining that the data transmission bandwidth limit is needed by the first wireless access point includes determining that the data transmission bandwidth limit is needed in response to a communication link operating at its maximum data transmission capacity, the communication link communicatively coupling the first wireless access point to a network element of the communication environment.

In another embodiment of the third aspect, determining that the data transmission bandwidth limit is needed by the first wireless access point includes determining that the data transmission bandwidth limit is needed in response to a communication link operating within a predetermined proximity to a maximum data transmission capacity of the communication link, the communication link communicatively coupling the first wireless access point to a network element of the communication environment.

In another embodiment of the third aspect, the first load information message indicates at least a respective data transmission rate for each device being served by the first wireless access point.

In another embodiment of the third aspect, the first wireless access point serves one or more respective devices of each of at least a first trust domain and a second trust domain, and the first load information message indicates at least a collective data transmission rate of the one or more respective devices of the first trust domain.

In a fourth aspect, a communication environment includes (1) a first wireless access point communicatively coupled to a network element of the communication environment by a first communication link, (2) a second wireless access point communicatively coupled to the network element of the communication environment by a second communication link, and (3) a system controller configured to cause the first wireless access point to limit bandwidth of a first data transmission between the first wireless access point and a first device without limiting bandwidth of a second data transmission between the first wireless access point and a second device.

In an embodiment of the fourth aspect, the first device is part of a first trust domain of the communication environment, and the second device is part of a second trust domain of the communication environment.

In a fifth aspect, a method for providing wireless communication service includes (1) serving a first device of a first trust domain using a first wireless access point, the first wireless access point being communicatively coupled to a network element of a communication environment by a first communication link and (2) serving a second device of the first trust domain using a second wireless access point, the second wireless access point being communicatively coupled to the network element of the communication environment by a second communication link.

In an embodiment of the fifth aspect, the first trust domain is associated with a particular unit of a multi dwelling unit building.

In another embodiment of the fifth aspect, the method further includes implementing a common trust domain policy for each of the first wireless communication device and the second wireless communication device.

In another embodiment of the fifth aspect, the first device and the second device appear to be served by a common wireless access point, from a perspective of a user using each of the first device and the second device.

In another embodiment of the fifth aspect, the method further includes serving a third device using the second wireless access point, the third device being part of a second trust domain that is different from the first trust domain.

In another embodiment of the fifth aspect, each of the first wireless access point and the second wireless access point is a Wi-Fi wireless access point.

In another embodiment of the fifth aspect, the network element of the communication environment includes a gateway.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
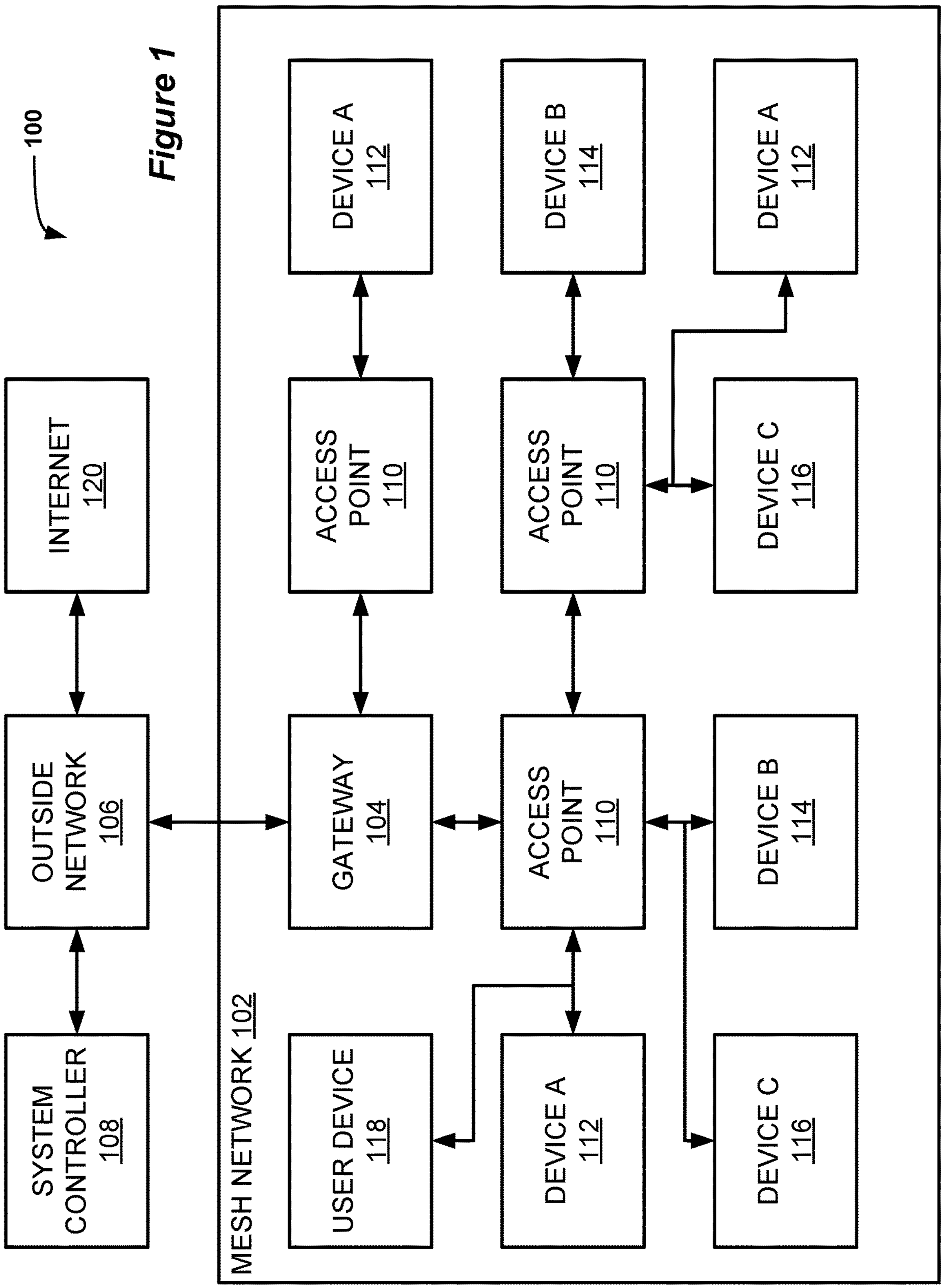
FIG. 1 illustrates a first computer network configured for adding and managing devices in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments are described below with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc. X-hauling is defined herein as any one of or a combination of front-hauling, backhauling, and mid-hauling.

In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

The present embodiments relate generally to managing computer networks, for example, to systems and methods for on-boarding new devices and managing resource allocation for devices on the network. For ease of explanation, the following description may generically refer to these several innovative embodiments as "the NetReach system." The NetReach system herein enables the user, consumer, and/or customer to easily add devices to a customized, private computer network to ensure that the features of the devices are properly used by the network. In particular, the present embodiments may include one or more of a device to be connected to the network, a device already connected to the network, a gateway, an access point (AP), and/or controller, and a set of network messages.

In one example of use, an individual in an area of use for the NetReach system can use the following steps to gain network access. First, the individual buys a use card. The card includes a code that allows for network access for a period of time for a specific number of devices. The individual then accesses an existing Wi-Fi network. This can be a mesh network associated with the NetReach system or another Wi-Fi network. The individual uses the Wi-Fi network to access a portal for the NetReach system. The address of the portal can be provided on the purchased use card. The individual gets the code from the card. In some embodiments, the code is protected being behind a scratch-off portion of the use card. The individual enters the code into the portal. The portal then provisions for specific number of devices to access the network using a specially created private network. The individual can then load the NetReach application onto their device. The portal and/or a NetReach server provide access information for the specific number of devices. The access information can include an SSID and password for each device. When a device connects to the Wi-Fi using the provided SSID and password, the device is provided with a software defined network (SDN) and/or a virtual private network for access.

In the present NetReach system, a series of micro-segmented networks are used to connect devices to a network and provide network connectivity. In the NetReach system, each micro-segmented network is associated with a subscriber. The micro-segmented network contains multiple connected devices, where the devices are visible to each other on the micro-segmented network and devices on other micro-segmented networks are not visible. Furthermore, the micro-segmented networks are access point agnostic, wherein a first device on the micro-segmented network may be connected through a first access point and a second device on the same micro-segmented network is connected through a second access point. In this system, the capabilities of the micro-segmented network and the devices on the micro-segmented network are set by one or more subscriber attributes. Subscriber attributes can include, but are not limited to, quality of service (QoS), bandwidth, data caps, up/down, operations support systems (OSS) attributes, business support systems attributes, and security models. The subscription and the micro-segmented networks are configured by a NetReach system controller.

The NetReach architecture described herein can provide internet service to subscribers in the form of a Wi-Fi subscription to a set of subscriber-owned devices. The Wi-Fi network around the subscriber's service area is hosted through a mesh of NetReach Access Points (AP's) that are shared across subscribers. One unique feature of the NetReach architecture is that the NetReach AP's host SSID's (Service Set IDentifier) are shared across subscribers, however the micro-segmentation capabilities within the NetReach AP's ensure that the traffic of each subscriber's device-set is isolated from each other. Each device connecting to the network is first authenticated with a device/subscriber-specific credential and upon successful authentication, it is added to the subscriber's micro-segmented network as long as it conforms to the business rules associated with the subscriber's rate plan.

In the NetReach architecture, each NetReach AP incorporates the multiple capabilities. First the AP's form a mesh and operate in a mesh architecture and have a persistent management channel with a cloud orchestrator or controller. Furthermore, each SSID is part of an extended service set (ESS) that is setup and managed from the cloud. In addition, an AP can be part of more than one ESS simultaneously. Moreover, each AP incorporates an SDN (Software-Defined Networking) logical switch to which the Wi-Fi layer access point is bridged to. The AP can support dhcp-relay with support for DHCP Option 82 along with Subscriber-Id sub-option 6 (RFC3993). The AP can also support multicast-to-unicast mode of transmission and Proxy ARP (Address Resolution Protocol). The Wi-Fi module on the AP can support 802.1Q VLAN tagging and Wi-Fi Multimedia (WMM). This NetReach architecture is described in greater detail below with respect to FIG. 5.

When a subscriber first registers for service (likely through an app on a mobile device), the subscriber will be assigned to a specific ESS that is operational in the subscriber's service area. There is a many-to-one relation between an ESS and subscriber, i.e., an ESS may serve multiple subscribers, however a given subscriber can only receive service from a single ESS. If the subscriber moves outside the range of the ESS, they will not be able to receive their service (this is similar to a user moving away from their own Wi-Fi network in their home). Upon initial registration of the subscriber, a unique VLAN will be assigned to that subscriber within that ESS (via all AP's that serve that ESS) and any device that the subscriber connects will be put into that VLAN. When a subscriber wants to connect a new device, they request a new credential/password for the new device through their app and then manually enter the password on that new device.

When a device attempts to associate to the Wi-Fi network, the device uses the provisioned password to authenticate to the network. The AP delegates the initial part of the authentication to the NetReach Authentication Service (NR-AS), which can be hosted on a NetReach server and/or a system controller, and which determines the password used by the device and resolves that to the specific subscriber. The NR-AS notifies the gateway of the mesh network which in turn updates the relevant AP's and pushes the appropriate configuration (DHCP lease info, VLAN assignment, temporal MAC association, SDN flow rules) to the AP's.

Each subscriber and their devices are identified by a subscriber specific VLAN and IP subnet. This allows the NetReach system to assign specific bandwidth and priority rules to the VLAN or groups of VLAN based on the subscription of the subscriber.

Additionally, the WMM feature can be used to provide different levels of service based on the subscriber. The WFA WMM specification defines four access categories (Background, Best Effort, Video, Voice). However, WMM does not specify or guarantee any throughput associated with the access categories. The AP determines how it treats traffic in each access category. The NetReach system sets appropriate CWmin and CWmax values for each access category and can create a mapping between access category and subscription access. This can allow the NetReach system to provide different levels of access, such as based on subscription type. For example, with two levels of subscription tiers—free, paid, the following mapping can be created:

TABLE 1

| | |
|---|---|
| Background | Free tier |
| Best Effort | Reserved |
| Video | Paid tier |
| Voice | Reserved |

This ensures that traffic for all VLAN's that are associated with a free tier subscription is treated with Background characteristics while traffic for VLAN's associated with a paid tier subscription is prioritized compared to the free tier. Note that this classification will only apply to downstream traffic from the AP to the device. There is no assumption or expectation that a device support WMM or that it even uses any WMM access categories. Even if a device specifies a specific WMM access category, the request may be stripped out by the AP and replaced with the appropriate access category based on the subscription tier of the device prior to further processing of the packet. This one-way prioritization is sufficient to create separate traffic-queues based on the subscription tiers. Furthermore, the additional access categories can be used to create additional subscription tiers as necessary.

In the first example, the subscriber gains access to a subscription through one of a plurality of different methods. In the first method, the subscriber purchases an access card that include an access code. In this method, the code may be hidden beneath a scratch-off portion. In the exemplary embodiment, the code provides network access for a period of time. In this method, the code/card could be purchased from a store. The subscriber can then submit the code as described herein. In some embodiment, the code is provided alphanumerically and/or in a scannable bar code or QR code. In the second method, the subscriber is able to pay online, such as through the online portal. In a third method, the subscriber is able to pay a monthly fee for access, such as by automatic billing to a bank account and/or a payment card.

The subscriber is able to connect to the NetReach portal, such as via a mobile computing device. The NetReach portal allows the user to set-up their subscription, such as by entering the card provided access code. The NetReach portal sets-up the subscriber's account and allows the subscriber to add network capable devices to the account. The account has access for a finite number of devices and the subscriber can pick which devices that they wish to add. Devices can include, but are not limited to, smart phones, tablets, laptop computers, smart TVs, Internet of Things (IoT) devices, and/or any other computer devices capable of interacting with the network as described herein.

In a further example, the subscription can have additional attributes, such as, but not limited to, quality of service (QoS), bandwidth, data caps, up/down, operations support systems (OSS) attributes, business support systems attributes, and security models. For example, an employer allows employees to work from home with work-provided computers and phones. The employer can also use the NetReach system to provide improved access to the employee, but only for their work-provided devices. While the employee may have their own router and corresponding home network, the work-provided devices are connected to the work-provided NetReach network. The work-provided devices are put in their own micro-segmented network and are not visible to the other devices in the employee's home or on the employee's home network. In addition, the work-provided network may limit the device's access to different web locations. For example, the work-provided network may only allow access to the work servers and not access to entertainment web-sites. In some embodiments, the NetReach network can control the DNS access for the devices on the network. Furthermore, the bandwidth, QoS, and other attributes of the work-provided network can be different than those of the home network, even though the devices of both networks are connecting through the same router/access point. In addition, the employer could pay for the subscription to provide the work-provided network.

In another example, fifteen students are sharing a dorm with Wi-Fi access through an access point. One of those students is working an internship at a company. The company wants the student to have better reception. The company pays for the student to get 25 down/10 up access through a NetReach network. The student, when using that network, gets that level of access, while the other students connecting to that access point have to compete for the rest of the Wi-Fi capability.

In a further example, a medical Internet of Things (IoT) device could be connected via a NetReach network. The NetReach network provides the device with network access to report any issues and/or report in on how the patient is doing. This secures the medical IoT device on its own network, and makes sure that it can communicate via the network without having to connect to the patient's home network. This allows the subscription for access to be paid for by a third party, such as the insurance, rather than the individual patient.

In an exemplary embodiment, the NetReach management device is the gateway of the network. In other embodiments, the NetReach management device is a part of the access network, such as by a modem termination system (MTS). In these configurations, the NetReach management device may manage all messages from and to the outside networks. In some embodiments, the NetReach management device is outside of the network. This NetReach management device may then provide information to the gateway and/or APs to allow them to connect to subscribed devices and provide network access based on their corresponding subscriptions.

The systems and methods described herein are not limited by the networking protocol used and can be applied to a plurality of network systems and types. These systems and types can include, but are not limited to, cable, 3GPPS 5G technology, optical networks, Low Earth Orbit (LEO) networks, ethernet based networks, IEEE systems (e.g., 802.11 and 16), 5G/MIMO (multiple input multiple output) (OFDM (orthogonal frequency-division multiplexing), BDMA), 4G LTE, 4G (CDMA) WiMAX, 3G HSPA+/UMTS (WCDMA/CDMA), 2G/GSM (TDMA/CDMA), Wi-Fi (all), Optical (PON/CPON/etc.), Ethernet (all: 10Base2, 10Base5, 10BaseT, 100BaseTX, 100Base FX, 1000Base SX, 1000Base LX, etc.), DSL, and RAN, for non-limiting examples.

FIG. 1 illustrates a NetReach architecture 100 configured for adding and managing devices in accordance with at least one embodiment. In an exemplary embodiment, NetReach architecture 100 includes a mesh network 102. In this example, mesh network 102 is depicted, by way of example and not in a limiting sense, a local area network (LAN) and includes a gateway 104 with access to one or more outside networks 106. Outside networks 106 may include, but are not limited to, the Internet, another LAN, an access network, and a wide area network (WAN). One of the advantages of the NetReach architecture 100 as described herein is that the systems and methods described herein can provide additional services with existing architecture.

Mesh network 102 includes a plurality of access points 110. Access points 110 connect to various devices, including device A 112, device B 114, device C 116, and user device 118 to mesh network 102. Access point 110 allows device A 112, device B 114, device C 116, and/or user device 118 to connect using wired and/or wireless connections. In the exemplary embodiment, the plurality of access points 110 cover an area, such as a residential area, to provide Wi-Fi access to individuals in the area of coverage. When a device is attached to the mesh network 102 via Wi-Fi, the devices messages are routed from one AP 110 to another AP 110 in the mesh network 102 until the messages reach a gateway 104 with access to outside networks 106, such as through a fiber backend.

In some embodiments, gateway 104 is also an access point 110. In other embodiments, the access points 110 are separate from gateway 104. The mesh network 102 includes multiple access points 110. Access points 110 can include, but are not limited to, a Wi-Fi router, a Wi-Fi extender, a hub, a router, a switch, and/or any other network device that allows devices to connect to the mesh network 102. In some embodiments, a plurality of access points 110 are provided around a neighborhood to provide Wi-Fi access to the neighborhood, where the plurality of access points 110 are not associated with any specific dwelling or family. In at least one embodiment, the plurality of access points 110 are attached to power poles or other utility poles.

Access points 110 can include a WAP (Wireless Application Protocol) module and incorporate the Wi-Fi hardware and the associated AP software, such as host ADP (access point daemon). The Wi-Fi chipset and software could include Wi-Fi 5 or higher with support for 802.1Q tagging, WMM (Wi-Fi Multimedia), multicast-to-unicast conversion, and support a minimum of 8 virtual SSID's. To ensure that traffic for each multi-segmented network is enforced, the AP 110 can include one or more virtual switches. The virtual switches are software defined switches, such as OpenVSwitch, to which the Access Point 110 bridges each device that connects to it. A virtual port interface is created for each device that connects to the AP 110 and the traffic is managed by the rules enforced in the virtual switch.

Devices A 112, B 114, and C 116 may include, but are not limited to, IoT devices, such as, but not limited to, IP cameras, smart home devices, smart televisions, smart speakers, and/or medical IoT devices, user computing devices, such as, but not limited to, smart phones, tablets, a personal digital assistant (PDA), and/or laptop computers, and/or any other computer devices capable of interacting with mesh network 102 as described herein. User devices 118 may include, but are not limited to, smart phones, tablets, laptop computers, a personal digital assistant (PDA), and/or any other computer devices capable of interacting with mesh network 102 as described herein. User devices 118 may connect to access point 110 by wired and/or wireless connections, based on the user device 118 itself. Some user devices 118 may be associated with the mesh network 102 and are connected to the mesh network 102 on a regular basis. Other user devices 118 may connect to mesh network 102 occasionally.

In at least one embodiment, a system controller 108 controls a plurality of micro-segmented networks associated with a plurality of subscribers. All device A's 112 are a part of a first micro-segmented network associated with subscriber A. Device B's 114 are a part of a second micro-segmented network associated with subscriber B. Device C's 116 are a part of a third micro-segmented network associated with subscriber C. User device 118 represents a device that is not currently associated with any micro-segmented network. Each micro-segmented network allows the devices on that network to see each other and to communicate with the outside network 106 and potentially the Internet 120. The system controller 108 is the component responsible for resolving the password used by a device while it is associating and authenticating with the network and determine the device eligibility, subscriber information, and subscription tier. The system controller 108 can be implemented as a distributed service with a local component to speed up the authentication.

Each micro-segmented network contains multiple connected devices, where the devices are visible to each other on the micro-segmented network and devices on other micro-segmented networks are not visible. Furthermore, the micro-segmented networks are access point 110 agnostic, wherein a first device on the micro-segmented network may be connected through a first access point and a second device on the same micro-segmented network is connected through a second access point.

The capabilities of the micro-segmented network and the devices on the micro-segmented network are set by one or more subscriber attributes. The subscription and the micro-segmented networks are configured by a NetReach system controller. Each micro-segmented network is capable of different levels of connectivity, based on both the subscriber's attributes. Subscriber attributes can include, but are not limited to, quality of service (QoS), bandwidth, data caps, up/down, operations support systems (OSS) attributes, business support systems attributes, and security models. For example, the first micro-segmented network can provide a first set of bandwidth and quality of service (QoS) attributes, while the second micro-segmented network can provide a second, different set of bandwidth and quality of service (QoS) attributes. Other attributes can include, but are not limited to, operations support systems (OSS) attributes, business support systems attributes, data caps, and security models.

In the exemplary embodiment, the system controller 108 stores the connection and identification data for each device that is a part of a micro-segmented network. The system controller 108 shares the connection and identification data with the gateway 104 and potentially the access points 110. In some embodiments, the micro-segmented networks are managed by the gateway 104. In other embodiments, the access points 110 manage the micro-segmented networks.

In some embodiments, the micro-segmented network controls the access that its devices have to the outside network 106 and/or the Internet 120. In at least one example, the micro-segmented network is associated with a workplace, where the devices are also associated with the workplace. The micro-segmented network can provide secure access to one or more servers and/or websites associated with the workplace, but not allow access to entertainment sites. In some further embodiments, the DNS is controlled and/or limited for the devices on the micro-segmented network. This can allow the system controller 108 to control the locations and IP addresses that the devices on the micro-segmented network are allowed to access.

In some embodiments, the different access points 110 of the mesh network 102 could be in different locations. For example, two access points 110 could be located in a first residential area, while another three access points 110 are in a second residential area, where the two residential areas are distant enough from each other that their wireless coverage doesn't overlap.

Exemplary embodiments for using micro-segmented networks may include the extendable micronetworks and subnet isolation subnetworks as potential implementations as a described in co-pending U.S. patent application Ser. No. 17/127,694, filed Apr. 28, 2021, Ser. No. 16/664,657, filed Oct. 25, 2019, Ser. No. 16/576,747, filed Sep. 19, 2019, Ser. No. 16/556,219, filed Aug. 29, 2019, Ser. No. 16/120,063, filed Aug. 31, 2018, and Ser. No. 15/443,855, filed Feb. 27, 2017, which are incorporated by reference herein.

In at least some embodiments, the system controller 108 is associated with a cable network operator. In these embodiments, the cable network operator organizes the different subscription levels of service and provides the network access. The cable network operator sets operator system rules and business system rules to organize the micro-segmented networks and subscriptions described herein.

In some further embodiments, the system controller 108 can provide access at the program level. Based on IP addresses and ports, the system controller 108 can restrict which messages are transmitted by each device on the micro-segmented network. The rules can be set so that only certain ports and/or certain IP addresses can be accessed. For example, for a work micro-segmented network, only programs such as Word, Excel, and Outlook are allowed to access the Internet 120, and those programs are only allowed to access specific websites. In still additional embodiments, individual ports can be monitored to ensure that the data from different applications is monitored and properly treated. For example, in one micro-segmented network, a video conferencing application can be prioritized over a word processing program or email program to ensure good video quality.

In the exemplary embodiment, gateways 104 capture inbound traffic from the outside network 106. This allows the gateway to effectively create a new SSID. The gateways 104 use software defined networks (SDN)s to create the individual micro-segmented networks. The gateways 104 identify each device, such as device A 112, device B 114, and device C 116, during onboarding and assign each device to the correct micro-segmented network. The gateways 104 also identify each device to the back-end systems, including the access points 110 and the system controller 108, for example. Since the gateways 104 receive all of the inbound traffic, they are able to properly route to the correct device in each of the micro-segmented networks. The gateways 104 can each track multiple micro-segmented networks in the mesh network 102, where each micro-segmented network includes multiple devices.

Furthermore, the gateways 104 are capable of determining the metering and provisioning for each device as described further herein. When a new device connects to the mesh network 106 using an SSID and password provided by the system controller 108, the gateway 104 can identify the device, secure it, authenticate it, and provide a custom network experience to the device based on the attributes of its micro-segmented network.

Figure 2:
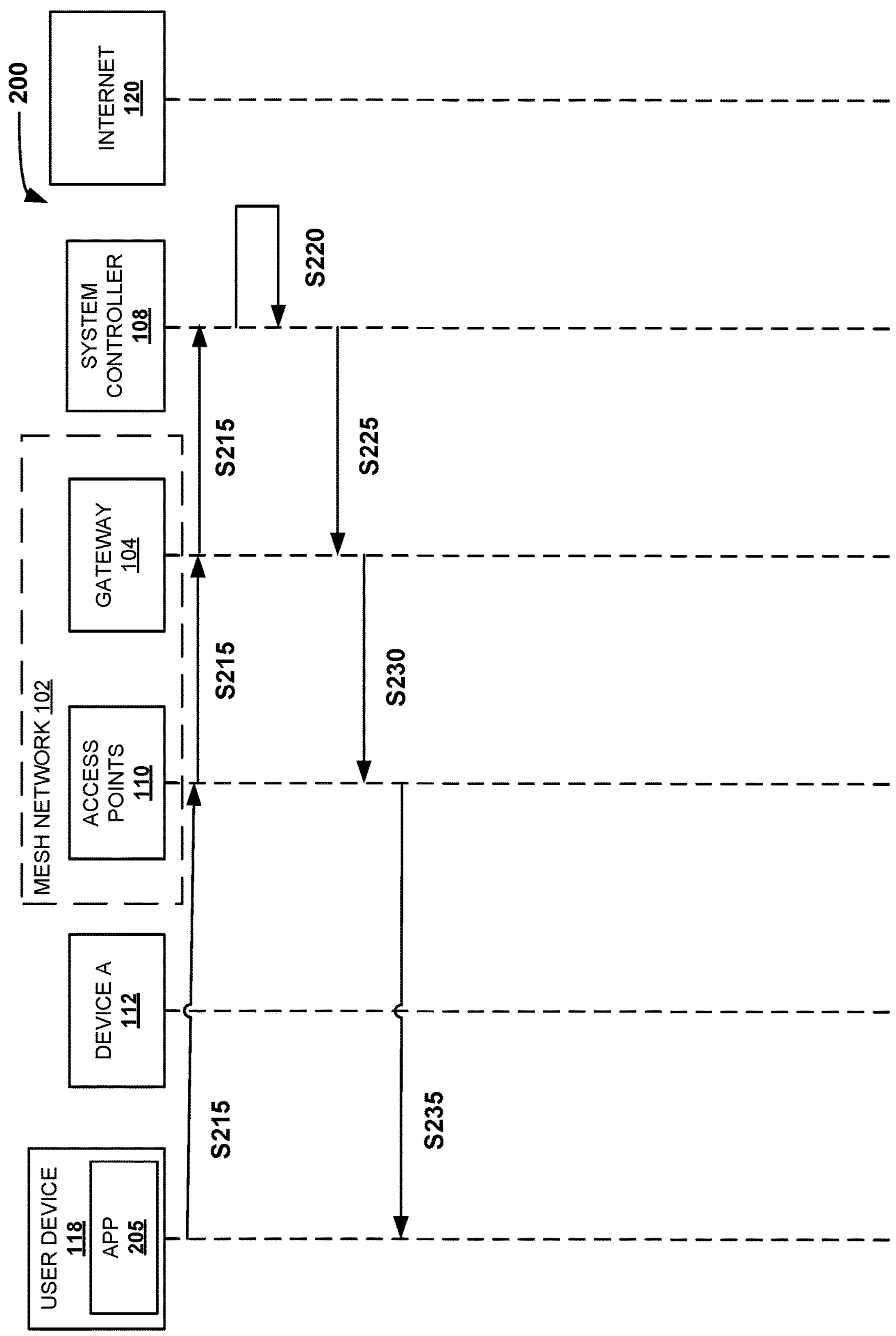
FIG. 2 illustrates a timing diagram of a process for activating a subscriber account for the mesh network shown in FIG. 1.

FIG. 2 illustrates a timing diagram of a process 200 for activating a subscriber account for the mesh network 102 (shown in FIG. 1). In the exemplary embodiment, user device 118 includes an app 205 for communicating with the system controller 108. In some embodiments, the app 205 is a web-browser, and the user device 118 can access a website to communicate with the system controller 108. In the exemplary embodiment, user device 118 connects to the mesh network 102 via access points 110, which can provide wired and/or wireless connections. In some embodiments, the gateway 104 and the access point 110 are separate devices. In other embodiments, the gateway 104 and the access point 110 are in the same device.

In the exemplary embodiment, the mesh network 102 includes a plurality of access points 110 in communication with one or more devices, such as device A 112, device B 114, and device C 116 (all shown in FIG. 1).

In step S215, the user device 118 connects to the mesh network 102 and transmits a request to connect with the system controller 108. The user device 118 is associated with a subscriber. The access points 110 forward the request to the gateway 104, which in turn routes the message to the system controller 108. The request information may include subscription information, such as subscriber payment information that allows the subscriber to create and/or update their subscription. In step S220, the system controller 108 analyzes the information in the request to determine if the request is valid. If the request is valid, then the system controller 108 updates the subscriber information including subscription. For example, the request can include a code giving the subscriber five days of access for up to five devices. The code can be provided as an alphanumeric code or as a scanned bar code or QR code. If the subscriber already has access then the code would extend their access by five days, for example. In addition to limited time use codes, the user can also set-up accounts that allow for a recurring subscription to be paid from an account, such as a payment card account and/or a banking account.

If the subscription is new or had previously expired, in step S225, the system controller 108 instructs the gateway 104 to set-up a micro-segmented network for the subscriber. The subscriber's micro-segmented network will only allow access for devices that the subscriber specifically sets up with the system controller 108, as shown in process 300 (shown in FIG. 3).

In some embodiments, in step S230, the gateway 104 informs the access points 110 on the mesh network 102 of the micro-segmented network for the subscriber. In step S235, the access point 110 informs the user device 118, via the app 205 of the updates to the subscription from the system controller 108. In some embodiments, the user can use process 200 to upgrade and/or change the subscription. In at least one embodiment, process 200 can be used to add more time for the subscription.

In a further embodiment, a micro-segmented network could be configured for a school. The students are provided with access to the school micro-segmented network. The access could be provided via cards with codes or other methodology as described herein. The students could each have their own micro-segmented network where they can add or remove their devices. The micro-segmented networks then provide the students' devices with network access, but only to reach the school system servers and resources.

In some embodiments, the user device 118 and/or app 205 is capable of directly connecting to the system controller 108, such as through a cellular connection. In other embodiments, the system controller 108 is always reachable by user devices 118 and any other device that attaches to the mesh network 102.

In some further embodiments, there is a system controller 108 associated with each mesh network 102. Furthermore, there is also a NetReach server that provides the capability to handle the billing for the subscriptions. This NetReach server is in communication with the plurality of system controllers 108 and provides information about whether or not the different subscriptions are valid and how long the subscriptions last. In these embodiments, the NetReach server can determine which mesh network 102 that the user is associated with and communicate with the corresponding system controller 108 to set-up the corresponding micro-segmented network.

Figure 3:
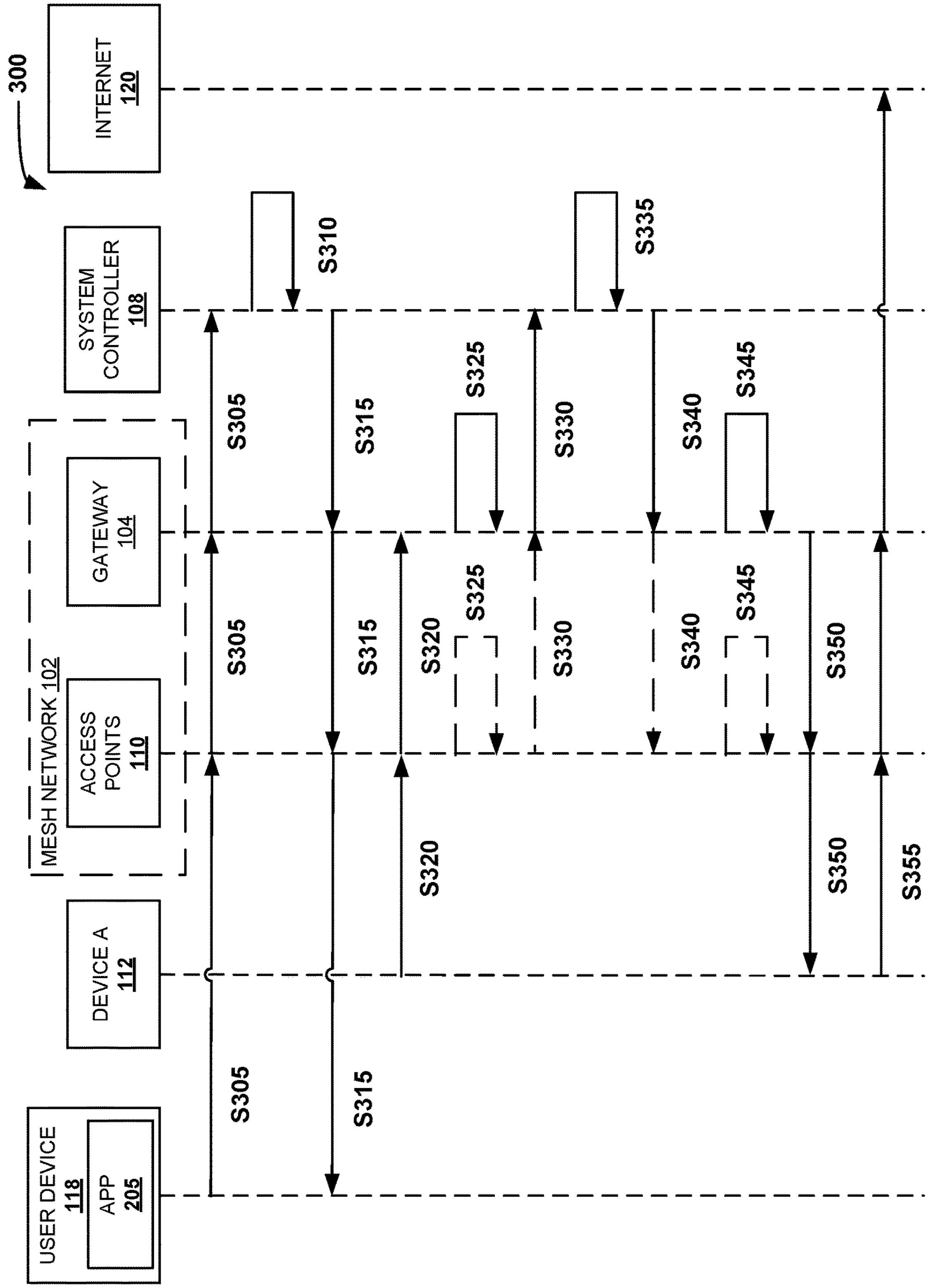
FIG. 3 illustrates a timing diagram of a process for adding a device to the subscriber account the mesh network shown in FIG. 1.

FIG. 3 illustrates a timing diagram of a process 300 for adding a device to the subscriber account the mesh network 102 (shown in FIG. 1). In process 300, the subscriber associated with the user device 118 has set-up a subscription with the system controller 108, and the system controller 108 has set-up a micro-segmented network for the subscriber.

In step S305, the user device 118, via the app 205, has requested an access code for connecting a first device, device A 112. The request is forwarded through the access points 110 and gateway 104 of the mesh network 102 to the system controller 108. In step S310, the system controller 108 determines which code to provide. In at least one embodiment, the code is a pre-shared key (PSK) which will only be associated with device A 112. The system controller 108 stores a PSK for each potential device that may be added to each micro-segmented network. For example, for the first micro-segmented network associated with the first subscriber, there may be the capability to connect up to five devices. For each of those five device slots, the system controller 108 creates and/or stores a PSK. The PSK is uniquely associated with the corresponding device. In some embodiments, the system controller 108 generates the PSKs when the subscription is activated, as illustrated in process 200 (shown in FIG. 2). In other embodiments, the system controller 108 generates the PSK on demand. In step S315, the system controller 108 transmits the PSK for the first device, which is forwarded to the user device 118.

In step S320, a user, such as the subscriber, attempts to connect device A 112 to the mesh network 102 and the micro-segmented network associated with the subscriber. The user enters the SSID for the mesh network 102 and the PSK provided by the system controller 108 as the password for the network. The SSID is the same for all devices on the mesh network 102; however, each password is unique for each device.

In some embodiments, the connection sequence is performed by the access point 110. In other embodiment, the connection sequence is performed by the gateway 104. In at least one embodiment, the system controller 108 provides the IP addresses and the preassigned PSK for each potential device on each micro-segmented network. In some of these embodiments, the IP addresses and preassigned PSKs are stored in each access point 110 and the gateway 104. In other of these embodiments, the IP addresses and the preassigned PSKs are just stored in the gateway 104. The IP addresses and preassigned PSKs can be shared to the individual access points 110 as needed. While, the IP address and preassigned PSK for each device slot is known, the MAC address is not known until the device connects and is onboarded into the micro-segmented network.

In the exemplary embodiment, step S320 initiates the WPA four-way handshake. When the user enters the PSK on device A 112, device A 112 attempts to authenticate with the host APD on the access point 110. During step S325, which is where the access point 110 and/or the gateway 104 initiates the message 2 exchange of the WPA four-way handshake, the access point 110 and/or gateway 104 grabs the values provided by the device A 112 and transmits those values to the system controller 108, as shown in step S330. The values can include, but are not limited to, anonce, snonce, device A MAC address, access point MAC address, SSID, and PSK. In some embodiments, the entire access request message is forwarded to the system controller 108. In step S335, the system controller 108 uses the provided information to look-up the device. The system controller 108 knows the neighborhood based on the SSID and/or the access point MAC address. The system controller 108 also knows all of the PSKs of all of the devices that are configured to be in that neighborhood. The system controller 108 uses the PSK that was provided in the password field on device A 112 to look up the corresponding micro-segmented network. If the values correspond to a known device, in step S340, the system controller 108 returns the vlan and deviceID for the host APD to continue the authentication process. The system controller 108 also transmits an update to the AP 110 and/or gateway 104 including the MAC address for device A 112, so that the AP 110 and/or gateway 104 can perform internal associations.

In step S345, the AP 110 and/or the gateway 104 completes the authentication process/four way handshake. The APs 110 and/or gateway 104 defines the micro-segmented network to include device A 112. Furthermore, the APs 110 and/or gateway 104 can define each micro-segmented network to be on a different subnet, so that each micro-segmented network can be considered a discrete network. When the authentication is complete, an authentication success message is transmitted to device A 112, in step S350.

Next device A 112 gets an IP address assigned to it for the micro-segmented network. Then in step S355, device A 112 can access the Internet 120 based on the attributes and limitations of its micro-segmented network. Attributes can include, but are not limited to, quality of service (QoS), bandwidth, data caps, up/down, operations support systems (OSS) attributes, business support systems attributes, and security models Additional devices can be added to the micro-segmented network based on the number of available device slots allowed by the system controller 108.

Devices can be removed from the micro-segmented network, by having a user device 118 access the system controller 108 and remove the device from micro-segmented network via the app 205. The system controller 108 then notifies the APs 110 and/or the gateway 104, that the device has been removed. The APs 110 and/or the gateway 104 informs the device that it has been removed. The APs 110 and/or the gateway 104 update their internal tables so that the device can no longer connect, as it has no credentials. The device will attempt to reconnect and then give up after a predetermined number of tries.

Any device web-capable device could be added to a micro-segmented network, as long as there is a slot available for that device. For example, user device 118 could be added to any of the first, second, or third micro-segmented networks.

In at least some embodiments, the system controller 108 meters the connections provided by the micro-segmented networks to ensure that each subscriber's micro-segmented network receives the appropriate network capacity. For example, a first subscriber and a second subscriber could both have 25 down and 10 up access. The system controller 108 monitors the behavior of the gateway 104 and/or the APs 110 to ensure that the two micro-segmented networks each receive the appropriate network bandwidth. Furthermore, the system controller 108 can also monitor the two micro-segmented networks to ensure that they don't exceed those parameters to the detriment of others on the mesh network 102.

In some embodiments, the NetReach architecture 100 (shown in FIG. 1) allows the user to travel to different locations on the network. For example, two mesh networks 102 at two locations could be associated with the same cable network provider. For this example, device A 112 is registered with a micro-segmented network on the first mesh network 102. If device A 112 travels to and then attempts to connect to the second mesh network 102, the system controller 108 can access a database of devices for approved micro-segmented networks and recognize device A 112 based on device A's SSID and password.

In some further embodiments, there is a system controller 108 associated with each mesh network 102. Furthermore, there is also a NetReach server that provides the capability to handle the billing for the subscriptions. This NetReach server is in communication with the plurality of system controllers 108 and provides information about whether or not the different subscriptions are valid and how long the subscriptions last. In these embodiments, the NetReach server is contacted by the user to set-up the individual devices in the mesh network 102 and the micro-segmented network. The NetReach server provides the necessary login information for device A 112, including the SSID and password.

In some embodiments, micro-segmented networks may include one or more policies that describe the operation of the micro-segmented network. In these embodiments, the policies can dictate how the devices on the micro-segmented network will behave as well as how the micro-segmented network will behave. These policies can be for the device A 112, the mesh network 102, the access points 110, and/or the gateway 104. For example, a policy may describe that only traffic from specific ports of device A 112 may be transported over the micro-segmented network or that only traffic to and from specific sites on the Internet 120 or outside network 106 may be accessed. Other policies may include, but are not limited to, bandwidth considerations, number of devices that can be active on the same time, restricted network locations, allowed network locations, security protocols, OSS and BSS rules, and/or any other policies desired.

In the exemplary embodiment, each device has a device specific password that is provided by the system controller 108. After the device is connected as shown in process 300, the device specific password is tied to the corresponding device's MAC.

In some additional embodiments, additional authentication elements for the device can be provided including digital certificates and private keys that can be used to authenticate the device 112 when it connects or reconnects to the mesh network 102 and its assigned micro-segmented network.

Figure 4:
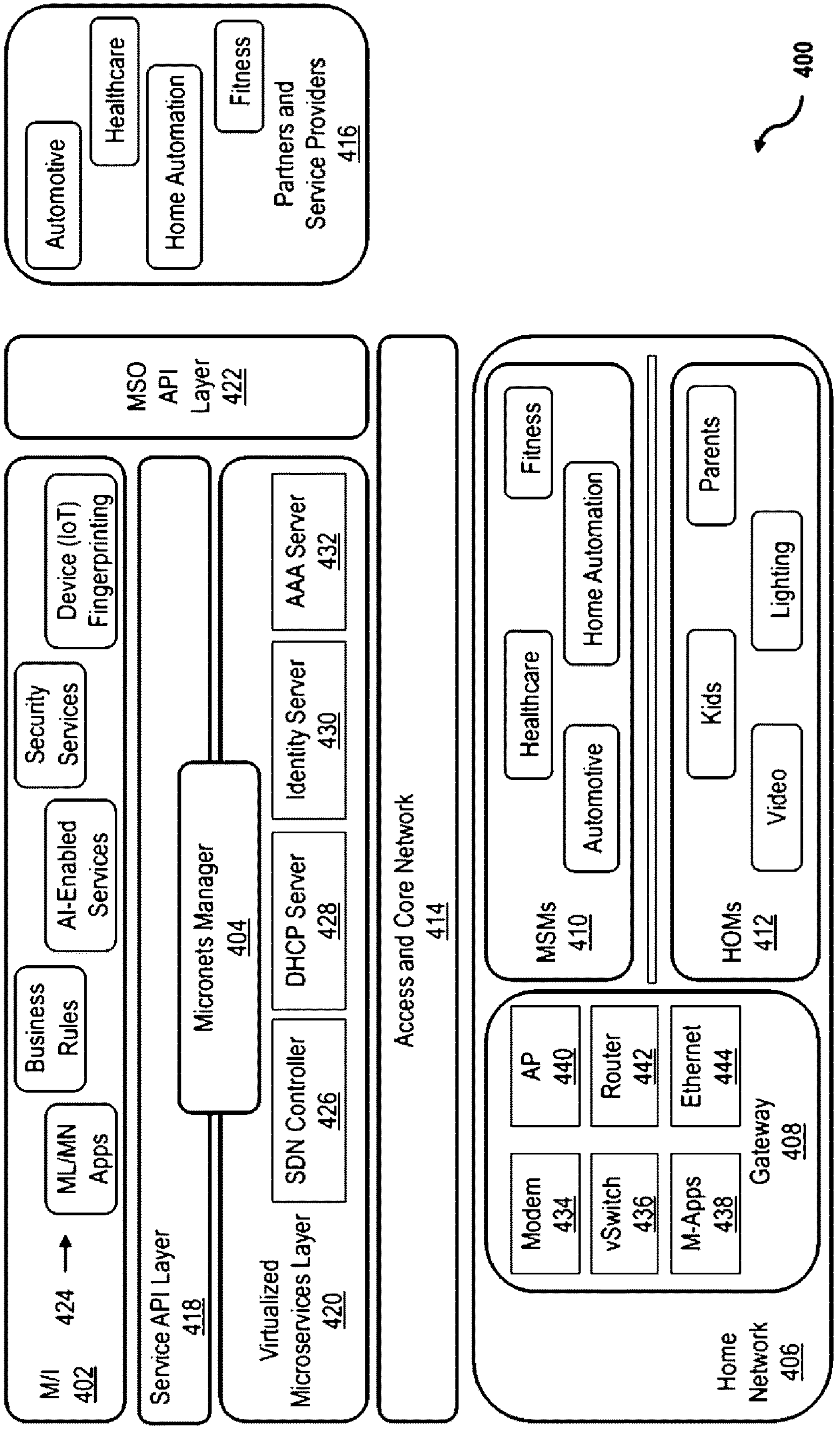
FIG. 4 is a schematic illustration depicting an exemplary micronetwork architecture, in an embodiment.

FIG. 4 is a schematic illustration depicting an exemplary micronetwork architecture 400. In an exemplary embodiment, architecture 400 may be implemented within the context of a larger networking system such as those described above with respect to the co-pending applications incorporated by reference herein. Accordingly, architecture 400 may further include several elements that are similar in structure and/or functionality to such micronetworking systems, including without limitation, a micronetwork infrastructure 402, a micronetwork manager 404, a home network 406 including a gateway 408, managed services micronetworks 410, and home owner micronetworks 412. Architecture 400 may further function with respect to an access and core network 414 and partner/service provider subsystems 416.

In an exemplary embodiment, architecture 400 further includes a service API layer 418 and a virtualized microservices layer 420 between micronetwork infrastructure 402 and access/core network 414, and an MSO API layer 422 for interfacing with partner/service provider subsystems 416.

In the exemplary embodiment depicted in FIG. 4, micronetwork infrastructure 402 represents an intelligent services layer configured to provide service information and/or guidance to the SDN or micronetwork controller to establish flow rules dynamically at the SDN switch. The intelligent services layer may include one or more advanced services 424, such as machine learning (ML) or neural network (NN) powered applications, business logic (e.g., conditional billing), AI-enabled services, security services, and/or device (e.g., IoT) fingerprinting. These services are described by way of example, and are not intended to represent an exhaustive list.

In an exemplary embodiment, virtualized microservices layer 420 represents a virtualized control layer for the microservices of one or more of an SDN controller 426, a DHCP server 428, an identity server 430, and an AAA server 432. In at least one embodiment, one or more of the microservices of virtualized microservices layer 420 may be cloud services, or operate from the cloud. Gateway 408 may thus include one or more of a modem 434, a virtual switch (VSwitch) 436, a micronetwork application layer 438, an AP 440, a router 442, and an ethernet 444. In this example the several managed services micronetworks 410 of home network 406 correspond to the respective environments of the several third party providers of partner/service provider subsystems 416.

Figure 5:
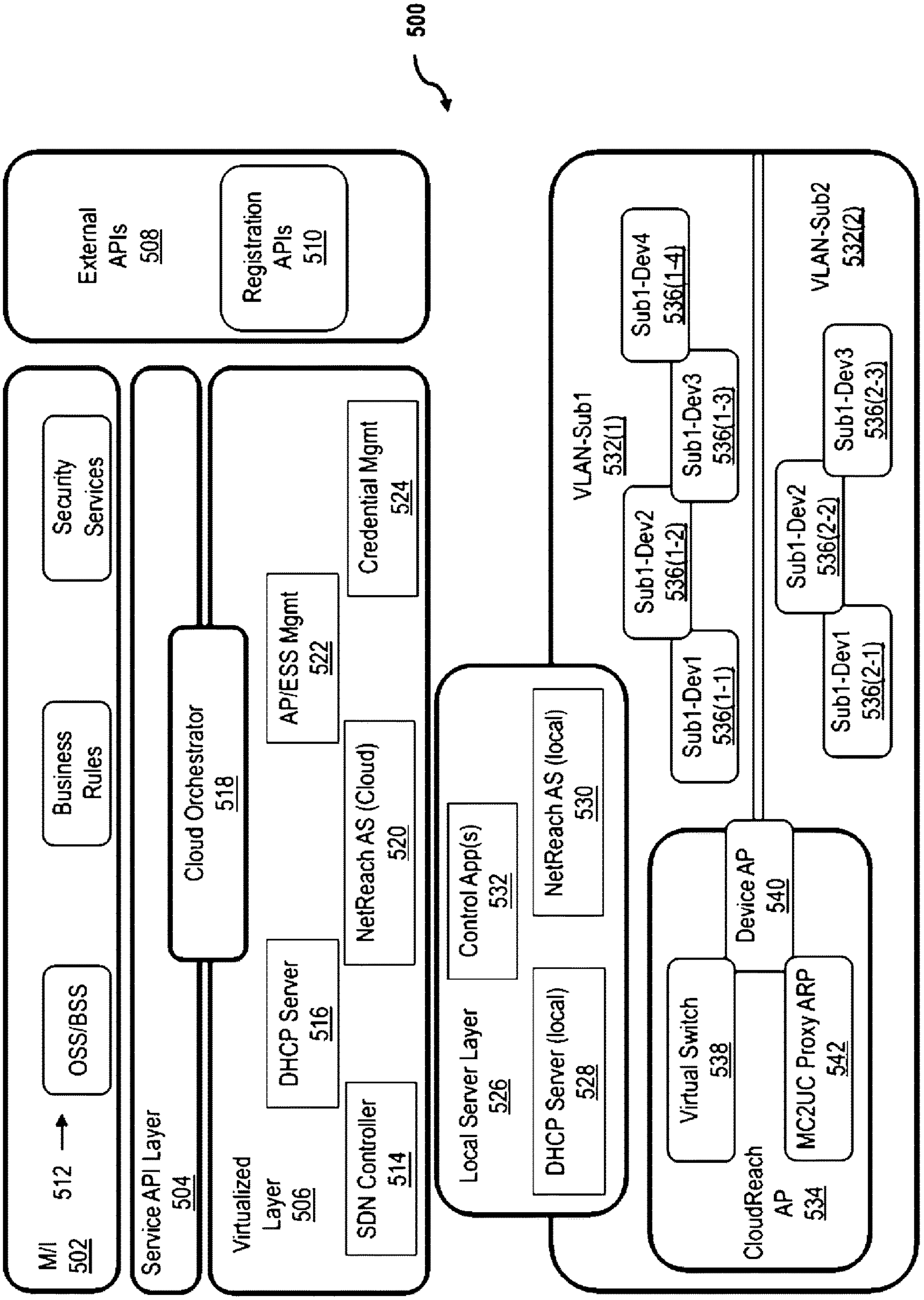
FIG. 5 is a schematic illustration depicting an exemplary functional diagram for a Netreach deployment utilizing a micronetwork configuration, in an embodiment.

FIG. 5 is a schematic illustration depicting an exemplary functional diagram 500 for a NetReach deployment utilizing a micronetwork configuration. As illustrated in FIG. 5, the NetReach deployment configuration of diagram 500 is similar, in several aspects, to architecture 400, FIG. 4. Accordingly, where common or similar components of diagram 500 utilize the same naming convention as relevant components of architecture 400, the person of ordinary art will understand that these common components share a similar structure and/or functionality.

Thus, in the embodiment depicted in FIG. 5, diagram 500 similarly includes a micronetwork infrastructure 502, a service API layer 504, and a virtualized microservices layer 506, all of which may operatively communicate with external APIs 508, which may in include one or more registration APIs 510. Also similar to architecture 400, an intelligent services layer of micronetwork infrastructure 502 may include one or more advanced services 512, such as OSS/BSS applications, business rules/logic, security services, etc., and virtualized microservices layer 506 may include an SDN controller 514 and a DHCP server 516.

Diagram 500 though, depicts an exemplary scenario of NetReach deployment within a Cloud environment similar to the examples described above. Accordingly, in the exemplary embodiment depicted in FIG. 5, micronetwork management functionality is performed by a Cloud orchestrator 518 logically disposed between service API layer 504 and virtualized microservices layer 506. Further to this example, virtualized microservices layer 506 may additionally include one or more of a Cloud NetReach authentication server (AS) 520, an AP/ESS manager 522, and a credential manager 524.

Also in this NetReach deployment example, a local server layer 526 may be disposed remotely from micronetwork infrastructure 502, Cloud orchestrator 518, and the several Cloud-based elements of virtualized microservices layer 506. As described above, local server layer 526 may include one or more local counterparts to virtualized microservices layer 506, including but not limited to, a local DHCP server 528, a local NetReach AS 530, and one or more control applications 532. As may be further seen from diagram 500, an individual gateway device is not needed at the local level to establish and manage multiple VLANs 532 for various respective subscribers.

That is, local server layer 526 may communicate with one or more NetReach APs, namely, CloudReach AP 534 in the exemplary embodiment depicted in FIG. 5, and each such NetReach/CloudReach AP 534 is enabled to individually manage one or more subscriber devices 536 within each single VLAN 532 established for each subscriber connecting to the particular NetReach/CloudReach AP 534. Accordingly, each NetReach/CloudReach AP 534 may include a virtual switch 538, as well as a device AP (e.g., a Wi-Fi layer AP) 540 for direct communication to and from individual subscriber devices 536. In the Cloud-based embodiment depicted in FIG. 5, NetReach/CloudReach AP 534 may further include a MC2UC Proxy ARP 542.

Thus, according to diagram 500, multiple NetReach/CloudReach APs 534 may be advantageously configured to form a mesh, and thereby operate in a mesh architecture. In the exemplary embodiment, each such NetReach/CloudReach AP 534 may be further configured to have a persistent management channel Cloud orchestrator 518, and each SSID within the mesh architecture may then be a portion of an ESS that is established and managed from the Cloud. In some embodiments, an individual AP may be a part of more than one ESS simultaneously.

In an exemplary embodiment, each AP 534 may further incorporate an SDN logical switch to which Wi-Fi layer device AP 540 is bridged. In some embodiments, AP 534 supports DHCP-relay with support for DHCP Option 82 along with Subscriber-Id sub-option 6 (RFC3993). In at least one embodiment, AP 534 supports multicast-to-unicast modes of transmission and Proxy ARP (e.g., Proxy ARP 542). In an exemplary embodiment, a Wi-Fi module on the AP (e.g., device AP 540) supports 802.1Q VLAN tagging and WMM.

In an exemplary embodiment, AP 534 thus functions as the WAP module, and incorporates the relevant Wi-Fi hardware and associated AP software (e.g., hostapd). In the exemplary embodiment, the relevant Wi-Fi chipset and software (not separately shown) may be Wi-Fi 5 or higher, and with support for 802.1Q tagging, WMM, multicast-to-unicast conversion, and at least 8 virtual SSIDs.

In an exemplary embodiment, virtual switch 538 may be a software defined switch (e.g., OpenVSwitch, or OVS) to which the particular AP 534 bridges each STA (e.g., subscriber devices 536) connecting to that AP. A virtual port interface (see e.g., FIG. 6, below) may then be created for each STA that connects to the AP, with the traffic therebetween being managed by rules enforced in virtual switch 538.

In an exemplary embodiment, NetReach AS 520 may function as the component responsible for resolving a password used by a subscriber device 536 while the device is associating and authenticating with the network, and also for determining the device eligibility, subscriber information, and/or relevant subscription tier. In some embodiments, Cloud NetReach AS 520 is implemented as a distributed service having a local component (e.g., local NetReach AS 530) to speed the authentication process.

In an embodiment, credential manager 524 may function as the component responsible for managing the subscriber account, and for integration with the OSS/BSS applications of advanced services 512. AP/ESS manger 522, on the other hand, may virtually serve as the functional equivalent of a wireless controller for managing the AP(s) 534 and ESS/SSIDs. Exemplary bridge and port configurations are described further below with respect to FIG. 6.

Figure 6:
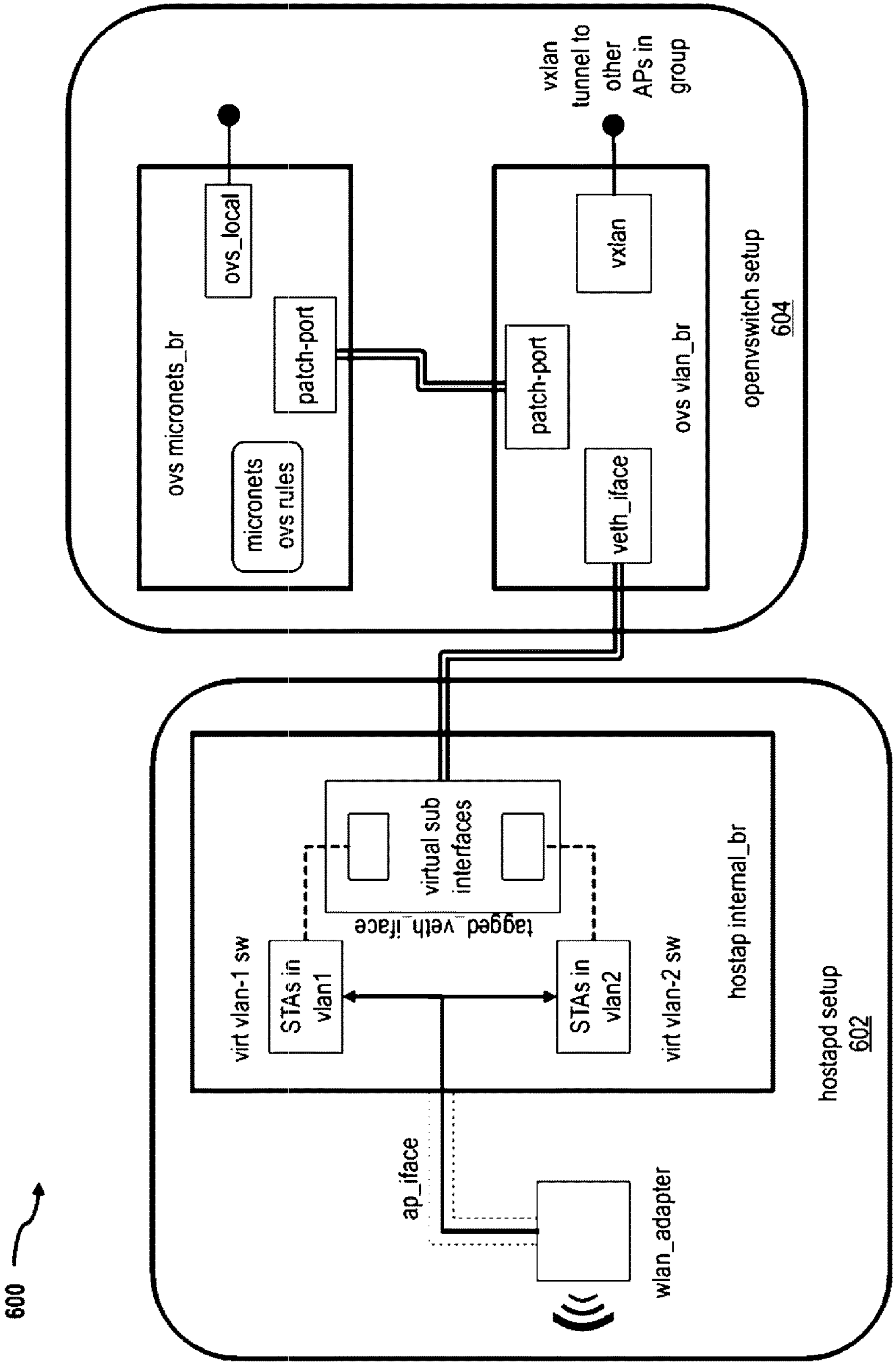
FIG. 6 is a schematic illustration depicting an exemplary trust domain configuration utilizing a host access point and an OpenVSwitch, in an embodiment.

FIG. 6 is a schematic illustration depicting an exemplary trust domain configuration 600 utilizing a HostAP and an OpenVSwitch (OVS). In the embodiment depicted in FIG. 6, configuration 600 illustrates one exemplary network bridge and port scenario enabling the HostAP and the OVS to segment connecting STAs into separate trust domains, i.e., micronetworks, according to the embodiments described herein.

In this illustrative example, configuration 600 includes a hostapd sub-configuration, or setup, 602, as well as the bridges and ports used therein, and an OVS setup 604. In exemplary operation of configuration 600, at the start of hostapd, hostapd setup 602 sets up an AP mode (e.g., ap_iface) on a particular wireless interface specified in a hostap.conf file. In an embodiment, hostapd setup 602 further creates an internal bridge on which it creates a controlled port for each STA that associates with the AP. Accordingly, in the case where the HostAP is configured to enable dynamic_vlan in a hostap.conf file, the HostAP may then be further advantageously configured to create an internal switch for each VLAN, as well as for each STA that is associated with the particular VLAN, which connects the controlled port of the STA to the corresponding VLAN switch.

In further exemplary operation, the HostAP is further enabled to determine the VLAN of a STA according to several mechanisms, including without limitation, a radius server, a "vlan_file" config option in hostap.conf, and/or a "wpa_psk_file" option in hostapd.conf. In some embodiments, where the wpa_psk_file contains a specific VLAN for a STA, the wpa_psk_file option may be configured to take precedence over other options/mechanisms. According to this particular NetReach setup, the configuration in the wpa_psk_file may be used as a sole source to assign each STA to a particular VLAN. Once traffic from a STA comes on the specific VLAN switch, the HostAP may then add a VLAN tag to the traffic packets, and then outputs the VLAN-tagged packet on a "vlan_tagged_interface" configuration option defined in the hostap.conf file.

In some embodiments, the HostAP creates a virtual sub-interface on the interface specified by the "vlan_tagged_interface", and may then bridge that VLAN-specific sub-interface to the internal VLAN switch on which the STAs are connected.

In further exemplary operation, for OVS setup 604, configuration may further create a linux "veth" pair prior to starting the HostAP or the OVS. In this example, the VLAN-tagged traffic is more readily ingested and managed. Under this sub-configuration, one port of the veth pair may be connected to the HostAP by specifying that port as the "vlan_tagged_interface" in the hostap.conf file, and the other port of the veth pair may be added to an OVS VLAN bridge (ovs vlan_br), thereby enabling the outbound traffic from STAs to appear on the OVS VLAN bridge as being VLAN-tagged. The OVS VLAN bridge (brhapd) thus functions to advantageously "bridge" the VLANs on all APs in an AP group through VXLAN tunnels (vxlan port), thereby ensuring that the normal MAC learning and STP logic functions on a per-VLAN basis. According to exemplary configuration 600, only one VXLAN tunnel thus needs to be created between each AP pair in the AP group, and irrespective of the number of VLANs that are actually created.

In further exemplary operation of configuration 600, the OVS VLAN bridge may be connected to an OVS micronetworks bridge (brmn001) through an OVS patch-port pair. According to this embodiment, the OVS micronetworks bridge contains the OVS flow rules that enforce the micro-segmentation logic, and thereby further ensure that traffic is isolated per micronetwork/VLAN. In some embodiments, the OVS micronetworks bridge may be further advantageously configured to perform several additional tasks, including without limitation, connection tracking, VLAN tag handling, etc., prior to egress through the OVS LOCAL port.

While the NetReach systems are discussed above primarily with respect to mesh networks, the NetReach systems are not limited to mesh network applications. Instead, in certain embodiments, two or more access points of a NetReach system may have dedicated data egress and ingress paths, such that each of the access points can directly exchange data with a gateway, or another network element, without assistance of another access point. Accordingly, in particular embodiments, two or more access points of a NetReach system may exchange data with the public Internet, or another network, without transmitting the data through another access point of the NetReach system.

Figure 7:
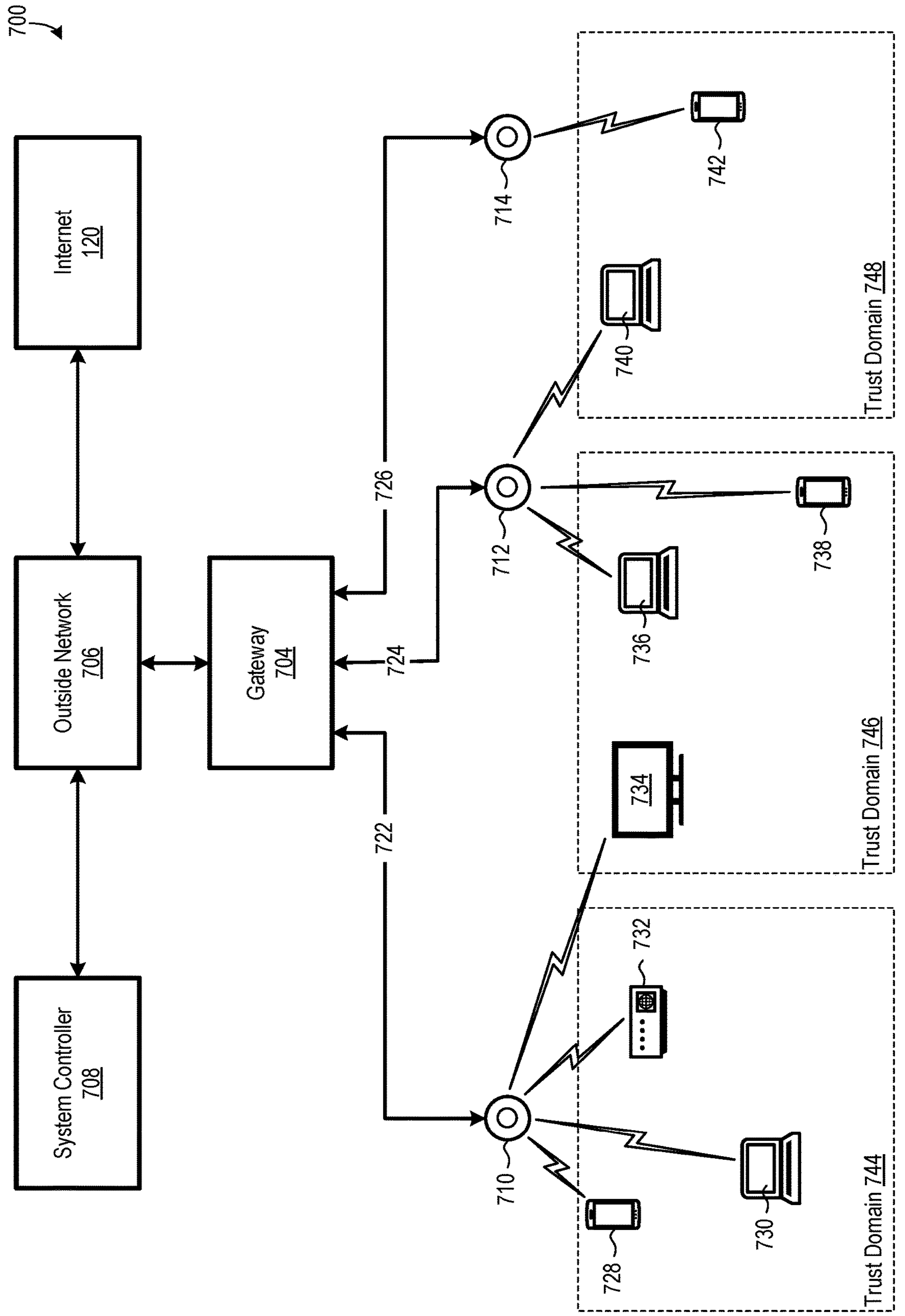
FIG. 7 illustrates a NetReach architecture including a plurality of wireless access points including dedicated data egress and ingress paths, in accordance with at least one embodiment.

For example, FIG. 7 illustrates a NetReach architecture 700 including a gateway 704, an outside network 706, a system controller 708, a wireless access point 710, a wireless access point 712, a wireless access point 714, the Internet 120, a communication link 722, a communication link 724, a communication link 726, a mobile telephone 728, a computer 730, a router 732, a smart television 734, a computer 736, a mobile telephone 738, a computer 740, and a mobile telephone 742. Gateway 704, outside network 706, and system controller 708 are embodiments of gateway 104 (FIG. 1), outside network 106 (FIG. 1), and system controller 108 (FIG. 1), respectively.

Each wireless access point 710, 712, and 714 is configured to wirelessly communicate with one or more devices, where wireless communication is symbolically shown by lightning bolts in FIG. 7. For example, in the FIG. 7 illustration, (a) wireless access point 710 is wirelessly communicating with each of mobile telephone 728, computer 730, router 732, and smart television 734, (b) wireless access point 712 is wirelessly communicating with each of computer 736, mobile telephone 738, and computer 740, and (c) wireless access point 714 is wirelessly communicating with mobile telephone 742. In some embodiments, each wireless access point 710, 712, and 714 is a Wi-Fi wireless access point, e.g., operating according to an Institute of Electrical and Electronics Engineers (IEEE) 802.11 standard. However, wireless access points 710, 712, and 714 could be other types of wireless access points, including but not limited to, Third Generation Partnership Project (3GPP) wireless access points, such as 3GPP fourth generation (4G) wireless access points, 3GPP fifth generation (5G) wireless access points, 3GPP sixth generation (6G) wireless access points, or successors thereof.

Wireless access points 710, 712, and 714 are communicatively coupled to gateway 704 via respective communication links 722, 724, and 726, where each communication link 722, 724, and 726 provides a dedicated data egress and ingress path for its respective wireless access point. Accordingly, wireless access points 710, 712, and 714 do not have a mesh configuration. As such, each wireless access point 710, 712, and 714 is capable of exchanging data with gateway 704 (and outside network 706 and the Internet 120) without the data passing through another wireless access point 710, 712, and 714. In some embodiments, each communication link 722, 724, and 726 is a dedicated physical communication link, such as a dedicated electrical cable (e.g., a dedicated Ethernet electrical cable, a dedicated electrical coaxial cable, etc.) or a dedicated optical cable. However, in some other embodiments, each communication link 722, 724, and 726 is a dedicated logical communication link that could be implemented by a shared physical cable or other physical medium. For example, each communication link 722, 724, and 726 could be embodied by a respective frequency range on a common electrical cable or by a respective wavelength range on a common optical cable. As another example, each communication link 722, 724, and 726 could be a virtual communication tunnel established over one or more physical communication links. Additionally, each communication link 722, 724, and 726 could be, or could include, a respective wireless communication link. While NetReach architecture 700 is illustrated as including three wireless access points, i.e., wireless access points 710, 712, and 714, the quantity of wireless access points in NetReach architecture 700 may vary. In some alternate embodiments, gateway 704 is omitted, and communication links 722, 724, and 726 directly communicatively couple respective wireless access points 710, 712, and 714 to outside network 706 (or even to the Internet 120).

System controller 708 establishes three trust domains 744, 746, and 748 in NetReach architecture 700. In some embodiments, each trust domain 744 corresponds to a respective subscriber or individual, a respective house, a respective unit of a multi-dwelling unit (MDU) building, a respective business, a respective application, or a respective class of devices, although trust domains 744, 746, and 748 may have other correspondence without departing from the scope hereof. It should be noted that there may be multiple trust domains associated with a given individual, subscriber, household, business, etc. Trust domain 744 includes mobile telephone 728, computer 730, and router 732, while trust domain 746 includes smart television 734, computer 736, and mobile telephone 738. Trust domain 748, in turn, includes computer 740 and mobile telephone 742. However, the quantity of trust domains in NetReach architecture 700, as well as the quantity and type of devices in each trust domain, may vary.

Each trust domain 744, 746, and 748 is a respective network segment of NetReach architecture 700. Accordingly, each trust domain 744, 746, and 748 allows its constituent devices to see each other, i.e., to be aware of the existence of each other and to potentially communicate with each other, as well as to communicate with the outside network 706 and potentially with the Internet 120. However, absent special circumstances, devices in one trust domain 744, 746, and 748 are not visible to devices in any other trust domain 744, 746, and 748 due to each trust domain being a respective network segment of NetReach architecture 700. For example, mobile telephone 728, computer 730, and router 732 of trust domain 744 may see each other and may communicate with outside network 706 and potentially the Internet 120. However, mobile telephone 728, computer 730, and router 732 of trust domain 744 may not see smart television 734, computer 736, or mobile telephone 738 of trust domain 746, or vice versa.

Each trust domain 744, 746, and 748 may implement one or more policies, such as on a trust domain basis and/or on a device basis. Examples of policies that may implemented on a trust domain basis and/or on a device basis include, but are not limited to, QoS, maximum bandwidth, data caps, data flow direction restrictions (e.g., uplink only or downlink only), OSS attributes, business support systems attributes, and security models. As another example, one or more of the following policies may be implemented on a trust domain basis:

(A) Per-Device Pass Trust Domain: each device in this trust domain is pre-allocated and assigned different respective credentials, such as to enable access to be granted or revoked on a per-device basis.

(B) Shared Pass Trust Domain with Confirmation: all devices in this trust group share common credentials, although a subscriber, or other party responsible for the trust domain, must confirm that each device is permitted to join the trust domain before the device will be granted access to the trust domain.

(C) Shared Pass Trust Domain with Limited-Time Access: all devices in this trust group share common credentials, but all devices in the trust group will be blocked after expiration of a lease time. This trust domain may be used, for example, to grant one or more devices temporary access to the Internet or another network.

(D) VPN Domain Trust Domain: this trust domain is bridged with an external domain or network, such as to limit devices of this trust domain to accessing one or more predetermined external resources.

Trust domains 744, 746, and 748 are access point agnostic, or stated differently, a device of any one of trust domains 744, 746, and 748 could potentially be served by any one of wireless access points 710, 712, and 714, or potentially even be simultaneously served by two or more wireless access points 710, 712, and 714. For example, the devices of trust domain 746 are collectively supported by two wireless access points. Specifically, smart television 734 is supported by wireless access point 710 while computer 736 and mobile telephone 738 are supported by wireless access point 712. As another example, the devices of trust domain 748 are collectively supported by two wireless access points, i.e., computer 740 is supported by wireless access point 712, while mobile telephone 742 is supported by wireless access point 714.

The fact that trust domains 744, 746, and 748 are access point agnostic promotes wide and robust wireless coverage in NetReach architecture 700 by enabling each device to be served by any wireless access point 710, 712, and 714. In particular, a given device is not limited to being served by any one wireless access point 710, 712, and 714; instead the device can be served, for example, by whichever access wireless point 710, 712, 714 is closest to a current location of the device, whichever wireless access point 710, 712, 714 that currently offers the best service to the device, whichever wireless access point 710, 712, 714 that currently has the greatest available capacity, etc.

However, there is potential for a given wireless access point 710, 712, and 714 to be overloaded and therefore be unable to provide adequate service to all of the devices that it is serving. For example, assume that smart television 734 of trust domain 746 is streaming high definition television content and thereby places a considerable load on wireless access point 710 and its respective communication link 722. Operation of smart television 734, which is part of trust domain 746, may therefore prevent wireless access point 710 from providing adequate service to the devices of trust domain 744 by overloading wireless access point 710 and/or its communication link 722. As such, the actions of a device of trust domain 746, i.e., smart television 734, may negatively impact operation of devices of trust domain 744. Such negative impact on service provided to devices of trust domain 744 by operation of a device of trust domain 746 may be undesirable.

Therefore, particular embodiments of system controller 708 are configured to perform traffic shaping, i.e., to selectively limit communication bandwidth, at each wireless access point 710, 712, and 714 on a per trust domain basis and/or on a per device basis, such as to help maintain adequate service to all devices served by the wireless access point irrespective of which trust domain that they are a part of. For instance, consider again the example above where smart television 734 is streaming high definition television content and thereby placing a large load on wireless access point 710 and its communication link 722. Particular embodiments of system controller 708 are configured to help prevent degradation of service to the devices of trust domain 744 caused by operation of smart television 734 by limiting bandwidth of data flowing through wireless access point 710 on a per trust domain basis and/or on a per device basis.

For example, system controller 708 may limit bandwidth of data flowing between wireless access point 710 and smart television 734 without limiting bandwidth of data flowing between wireless access point 710 and the devices of trust domain 744, to help prevent operation of smart television 734 from negatively impacting performance of the devices of trust domain 744. As another example, system controller 708 may limit bandwidth of data flowing between wireless access point 710 and smart television 734 to a greater extent than it limits bandwidth of data flowing between wireless access point 710 and the devices of trust domain 744, to help prevent operation of smart television 734 from negatively impacting performance of the devices of trust domain 744. System controller 708 may limit bandwidth of data flowing between wireless access point 710 and smart television 734, for instance, in accordance with a policy associated with trust domain 746 or smart television 734, or to an extent required to prevent operation of smart television 734 for interfering with NetReach architecture 700's ability to provide a predetermined level of service, e.g., a predetermined communication bandwidth, to the devices of trust domain 744.

Figure 8:
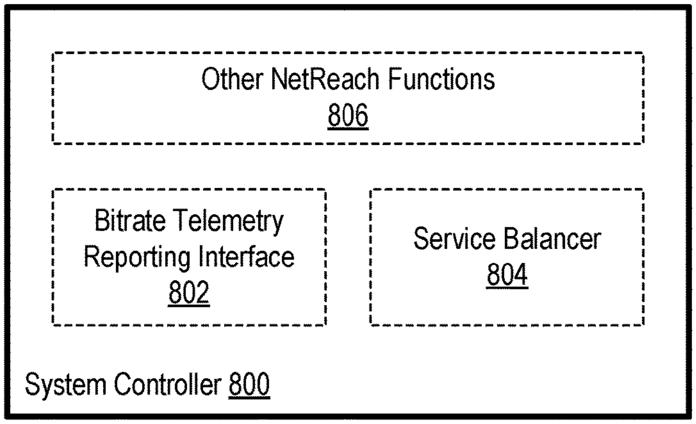
FIG. 8 is a block diagram of one embodiment of a system controller of the FIG. 7 NetReach architecture.

FIG. 8 is a block diagram of a system controller 800, which is one embodiment of system controller 708 (FIG. 7) configured to perform traffic shaping at each wireless access point 710, 712, and 714 on a per trust domain basis and/or on a per device basis. System controller 800 includes a bitrate telemetry reporting interface 802, henceforth "reporting interface 802" for brevity, a service balancer 804, and other NetReach Functions 806. Reporting interface 802 is configured to receive load information from each wireless access point 710, 712, and 714, such as on a periodic basis and/or in response to a change in load exceeding a predetermined threshold, so that system controller 800 has knowledge of the respective loads of each wireless access point 710, 712, and 714. A load of an access point is expressed, for example, as a transmission rate of all data flowing through the access point, a transmission rate of collective data flowing between the access point and all devices of a trust domain, or a transmission rate of data flowing between the access point and a single device. A data transmission rate is expressed, for example, as a bitrate. For example, in some embodiments, reporting interface 802 receives egress data bitrate on a per-trust domain basis, and/or on a per-device basis, from each wireless access point 710, 712, and 714, such as periodically and/or in response to a data transmission rate change exceeding a predetermined threshold.

Service balancer 804 is configured to implement traffic shaping by issuing per-trust domain and/or per-device data transmission bandwidth limits to one or more wireless access points 710, 712, and 714 at least partially based on load information received via reporting interface 802, where a data transmission bandwidth limit specifies, for example, a maximum data transmission bitrate. For example, in some embodiments, service balancer 804 may issue a data transmission bandwidth limit to a wireless access point 710, 712, or 714 to limit bandwidth of data transferred between the wireless access point and a given device, or between the wireless access point and devices of a given trust domain, to a particular maximum value. The particular maximum value is selected, for example, to prevent saturation of a wireless access point's respective communication link 722, 724, or 726. As another example, in certain embodiments, service balancer 804 may issue a data transmission bandwidth limit to a wireless access point 710, 712, or 714 to limit bandwidth of data transferred between the wireless access point and a given device, or between the wireless access point and all devices of a given first trust domain, to an amount which enables the wireless access point to provide data transfer between the wireless access point and devices of a second trust domain at a predetermined minimum data transmission rate or greater.

Particular embodiments of service balancer 804 determine bitrate limits, for example, using one or more algorithms configured to determine a minimum per-device or per-trust domain bitrate limit which enables a wireless access point 710, 712, or 714 to provide at least a predetermined minimum level of service, such as a minimum data transfer bandwidth, for one or more devices and/or trust domains served by the wireless access point. Furthermore, some embodiments of service balancer 804 use artificial intelligence, and/or another form of machine learning, to determine bitrate limits on a per-device basis and/or on a per-trust domain basis, such as to achieve an allocation of capacity of a given wireless access point 710, 712, or 714 among devices and/or trust domains which achieves one or more predetermined criteria, such as ensuring minimum data transmission bandwidth for one or more devices and/or trust domains while promoting high performance of one or more devices with high data transmission bandwidth needs.

Other NetReach Functions 806, in turn, represent other possible functions of a NetReach system controller as discussed above. Other NetReach functions 806 are included in FIG. 8 solely to show that system controller 800 will typically include functionality in addition to that of reporting interface 802 and service balancer 804, and other NetReach functions 806 are accordingly not further discussed.

The elements of system controller 800 are implemented, for example, by analog and/or digital electronic circuitry. In certain embodiments, system controller 800 is embodied by one or more processors (not shown) executing instructions, such as in the form of software and/or firmware, stored in one or more memories (not shown), to perform the functions of system controller 800. In some embodiments, system controller 800 is at least partially implemented in a distributed computing environment, such as a cloud computing environment. While reporting interface 802, service balancer 804, and other NetReach functions 806 are depicted as being separate elements, two or more of these elements could be partially or fully combined.

Figure 9:
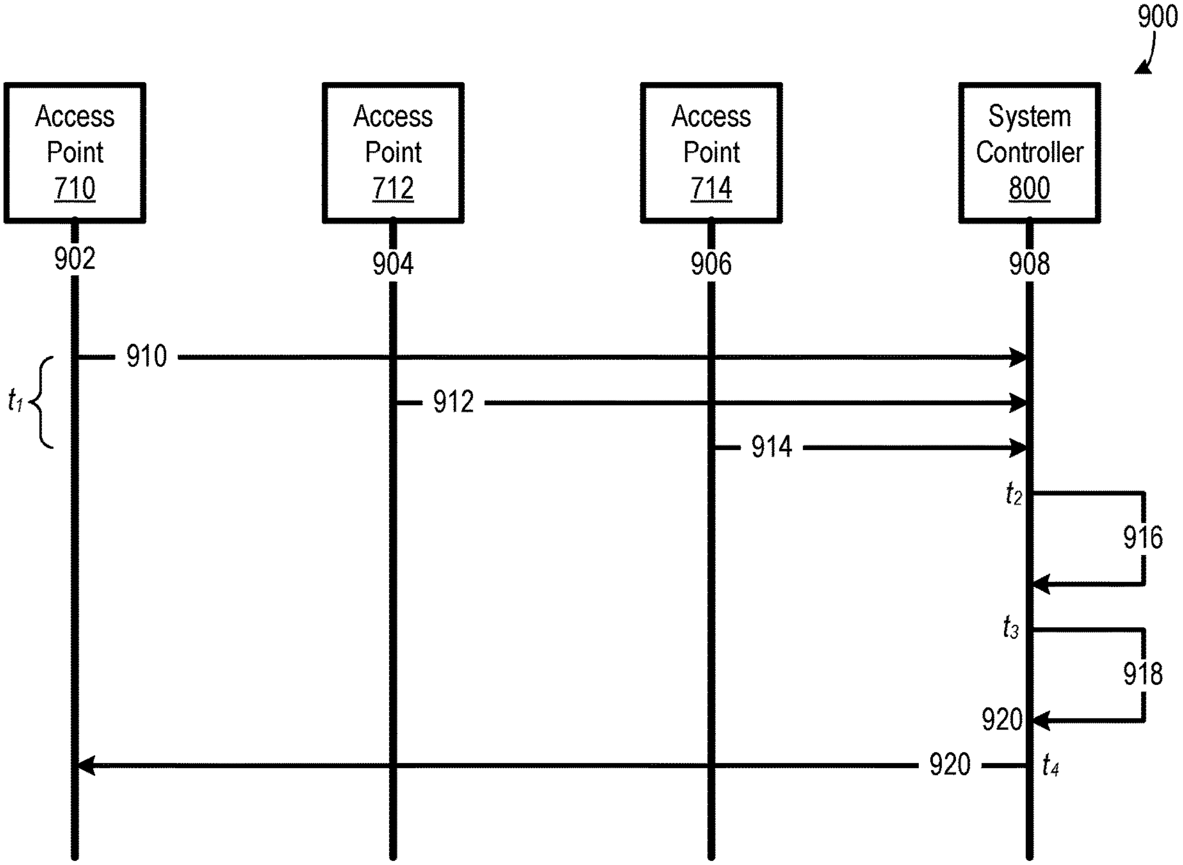
FIG. 9 is a dataflow diagram illustrating one example of operation of the FIG. 7 NetReach architecture including an embodiment of the FIG. 8 system controller.

FIG. 9 is a dataflow diagram 900 illustrating one example of operation of NetReach architecture 700 (FIG. 7) with system controller 708 embodied by system controller 800 (FIG. 8). Dataflow diagram 900 includes vertical lines 902, 904, 906, and 908 logically representing wireless access point 710, wireless access point 712, wireless access point 714, and system controller 800, respectively. At a time $t_1$, wireless access points 710, 712, and 714 send respective load information messages 910, 912, and 914 to system controller 900, e.g., via outside network 706, gateway 704, and communication link 722. FIG. 9 shows load information messages 910, 912, and 914 being sent to system controller 800 at different respective times to enable a viewer to distinguish between the three messages. It is understood, though, that messages 910, 912, 914 could be simultaneously sent by their respective wireless access points to system controller 800.

Each load information message 910, 912, 914 indicates one or more data transmission rates, e.g., egress data bitrate, for its respective wireless access point 710, 712, and 714 on a per-device and/or per-trust domain basis. For example, in particular embodiments, load messages 910, 912, and 914 indicate data transmission rates as follows:

(A) Load information message 910: (1) indicates respective egress data bitrate of each of mobile telephone 728, computer 730, router 732, and smart television 734, (2) indicates collective egress data bitrate of all devices of trust domain 744 being served by wireless access point 710, i.e., collective egress data bitrate of mobile telephone 728, computer 730, and router 732, and (3) indicates collective egress data bitrate of all devices of trust domain 746 being served by wireless access point 710, i.e., egress data bitrate of smart television 734.

(B) Load information message 912: (1) indicates respective egress data bitrate of computer 736, mobile telephone 738, and computer 740, (2) indicates collective egress data bitrate of all devices of trust domain 746 being served by wireless access point 712, i.e., collective egress data bitrate of computer 736 and mobile telephone 738, and (3) indicates collective egress data bitrate of all devices of trust domain 748 being served by wireless access point 712, i.e., egress data bitrate of computer 740.

(C) Load information message 914: (1) indicates respective egress data bitrate of mobile telephone 742, and (2) indicates collective egress data bitrate of all devices of trust domain 748 being served by wireless access point 714, i.e., egress data bitrate of mobile telephone 742.

System controller 800 receives each of load information messages 910, 912, and 914 via reporting interface 802 (not shown in FIG. 9). At a time $t_2$, service balancer 804 (not shown in FIG. 8) of system controller 800 determines 916 from load information messages 910, 912, and 914 whether any data transmission bandwidth limits are needed by one or more of wireless access points 710, 712, and 714. Service balancer 804 determines that a data transmission bandwidth limit is needed by a wireless access point 710, 712, or 714, for example, in response to the wireless access point's respective communication link 722, 724, or 726 operating at its maximum data transmission capacity, or in response to the wireless access point's respective communication link 722, 724, or 726 operating within a predetermined proximity to its maximum data transmission capacity. For example, in particular embodiments, service balancer 804 determines that an egress data transmission bandwidth limit is needed by a wireless access point 710, 712, or 714 in response to current data transfer rate of the wireless access point's respective communication link 722, 724, or 726 being within 95 percent, 90 percent, 85 percent, 80 percent, 75 percent, etc. of the communication link's maximum data transmission rate. In the example of FIG. 9, it is assumed that service balancer 804 determines from load information message 910 that an egress data transmission bandwidth limit needs to be issued to wireless access point 710.

At a time $t_3$, service balancer 804 issues 918 an egress data transmission bandwidth limit 920 in response to service balancer 804 determining 916 that an egress data bandwidth limit is needed by wireless access point 710. In one example operating scenario, service balancer 918 determines that operation of smart television 734 is responsible for wireless access point 710's communication link 722 operating within a predetermined proximity of communication link 722's maximum data transmission capacity, and service balancer 804 therefore issues 918 egress data transmission bandwidth limit 920 that is specific to smart television 734. For example, egress data transmission bandwidth limit 920 may instruct access point 710 to limit a rate of data transmission between access point 710 and smart television 734 to particular maximum bitrate, without affecting rate of data transmission between access point 710 and each of mobile telephone 728, computer 730, and router 732.

At a time $t_4$, system controller 800 sends egress data transmission bandwidth limit 920 to access point 710, e.g., via outside network 706, gateway 704, and communication link 722. Access point 710 then limits bandwidth of data transmission between access point 710 and smart television 734 according to egress data transmission bandwidth limit 920, such as by limiting a rate of data transmission between access point 710 and smart television 734 to a bitrate specified by bandwidth limit 920, without affecting data transmission rate between access point 710 and each of mobile telephone 728, computer 730, and router 732.

Figure 10:
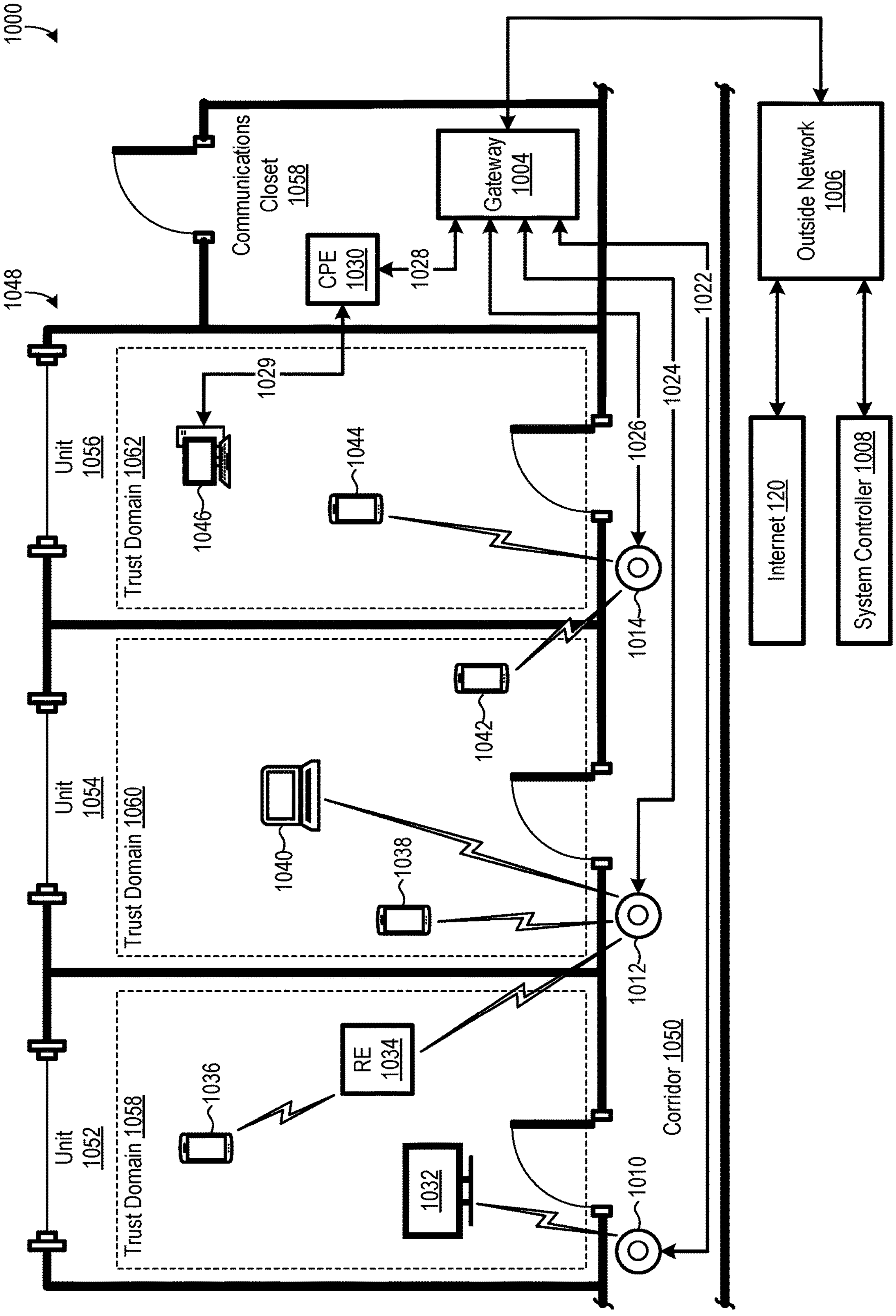
FIG. 10 illustrates another NetReach architecture including a plurality of wireless access points including dedicated data egress and ingress paths, in accordance with at least one embodiment.

FIG. 10 illustrates a Netreach architecture 1000 which is another embodiment of a NetReach architecture including a plurality of wireless access points having dedicated data egress and ingress paths. NetReach architecture 1000 includes the Internet 120, a gateway 1004, an outside network 1006, a system controller 1008, a wireless access point 1010, a wireless access point 1012, a wireless access point 1014, a communication link 1022, a communication link 1024, a communication link 1026, a communication link 1028, a communication link 1029, CPE 1030, a smart television 1032, a range extender (RE) 1034, a mobile telephone 1036, a mobile telephone 1038, a computer 1040, a mobile telephone 1042, a mobile telephone 1044, a computer 1046, and a multi dwelling unit (MDU) building 1048. Gateway 1004, outside network 1006, and system controller 1008 are embodiments of gateway 104 (FIG. 1), outside network 106 (FIG. 1), and system controller 108 (FIG. 1), respectively. Gateway 1004 and CPE 1030 are located within a communications closet 1058 of MDU building 1048.

MDU building 1048 includes a corridor 1050, a unit 1052, a unit 1054, a unit 1056, and communications closet 1058. The size and configuration of MDU building 1048 may vary without departing from the scope hereof. For example, MDU building 1048 may have a different quantity of units, a different configuration of units, additional or fewer rooms, etc. In some embodiments, each unit 1052, 1054, and 1056 is, for example, an apartment, a condominium, a hotel room, a dormitory room, a hospital room, etc. Accordingly, in certain embodiments, MDU building 1048 is an apartment building, a condominium building, a hotel, a dormitory, a hospital, etc.

Each wireless access point 1010, 1012, and 1014 is configured to wirelessly communicate with one or more devices, where wireless communication is symbolically shown by lightning bolts in FIG. 10. For example, in the FIG. 10 illustration, (a) wireless access point 1010 is wirelessly communicating with smart television 1032, (b) wireless access point 1012 is wirelessly communicating with each of range extender 1034, mobile telephone 1038, and computer 1040, and (c) wireless access point 1014 is wirelessly communicating with each of mobile telephone 1042 and mobile telephone 1044. Range extender 1034, in turn, is wirelessly communicating with mobile phone 1036, such that mobile phone 1036 is communicatively coupled to wireless access point 1012 via range extender 1034. In some embodiments, each wireless access point 1010, 1012, and 1014 is a Wi-Fi wireless access point, e.g., operating according to an IEEE 802.11 standard. However, wireless access points 1010, 1012, and 1014 could be other types of wireless access points, including but not limited to, 3GPP wireless access points, such as 3GPP 4G wireless access points, 3GPP 5G wireless access points, 3GPP 6G wireless access points, or successors thereof.

Wireless access points 1010, 1012, and 1014 are communicatively coupled to gateway 1004 via respective communication links 1022, 1024, and 1026, where each communication link 1022, 1024, and 1026 provides a dedicated data egress and ingress path for its respective wireless access point. Accordingly, wireless access points 1010, 1012, and 1014 do not have a mesh configuration. As such, each wireless access point 1010, 1012, and 1014 is capable of exchanging data with gateway 1004 (and outside network 1006 and the Internet 120) without the data passing through another wireless access point 1010, 1012, and 1014. In some embodiments, each communication link 1022, 1024, and 1026 is a dedicated physical communication link, such as a dedicated electrical cable (e.g., a dedicated Ethernet electrical cable, a dedicated electrical coaxial cable, etc.) or a dedicated optical cable. However, in some other embodiments, each communication link 1022, 1024, and 1026 is a dedicated logical communication link that could be implemented by a shared physical cable or other physical medium. For example, each communication link 1022, 1024, and 1026 could be embodied by a respective frequency range on a common electrical cable or by a respective wavelength range on a common optical cable. As another example, each communication link 1022, 1024, and 1026 could be a virtual communication tunnel established by one or more physical communication links. Additionally, each communication link 1022, 1024, and 1026 could be, or could include, a respective wireless communication link. In some alternate embodiments, gateway 1004 is omitted, and communication links 1022, 1024, and 1026 directly communicatively couple respective wireless access points 1010, 1012, and 1014 to outside network 1006 (or even to the Internet 120).

While wireless access points 1010, 1012, and 1014 are located in corridor 1050, one or more of the wireless access points could instead be located in a unit or in another alterative location within MDU building 1048, or outside of MDU building 1048. Additionally, the quantity of wireless access points in NetReach architecture 1000 may vary. For example, one or more additional wireless access points could be added, such as to expand wireless communication coverage and/or capacity in MDU building 1048 and/or outside of MDU building 1048. As another example, wireless access point 1010 could be omitted so that wireless access points 1012 and 1014 are the sole wireless access points in MDU building 1048.

CPE 1030 is communicatively coupled to gateway 1004 via communication link 1028. CPE 1030 includes, for example, a router and/or a switch. While CPE 1030 is located in communications closet 1030, CPE 1030 is dedicated to use by devices in unit 1056. CPE 1030 is included in NetReach architecture 1000, for example, to enable use of devices that do not have wireless communication capability, or to provide occupants of unit 1056 a choice of using either wireless or wired connectivity for Internet access. Computer 1046 is connected to CPE 1030 via a wireline communication link 1029, and computer 1046 is therefore communicatively coupled to gateway 1004 via CPE 1030. Wireline communication link 1029 includes, for example, an Ethernet communication link, an optical communication link, a home networking communication link (e.g., using a Multi-Media over Coax (MoCA) standard or a HomePNA (G.hn) standard), a power line communication link, etc. In some alternate embodiments, CPE 1030 includes additional ports, such as a respective port for each unit 1052, 1054, and 1056 so that CPE 1030 is capable of providing a respective wired connection for each unit 1052, 1054, and 1056.

System controller 1008 establishes respective trust domains 1058, 1060, and 1062 for each unit 1052, 1054, and 1056. In some embodiments, each trust domain 1058, 1060, and 1062 is directly associated with its respective unit 1052, 1054, and 1056, while in some other embodiments, each trust domain 1058, 1060, and 1062 is indirectly associated with its respective unit 1052, 1054, and 1056, such as via a respective occupant of each unit. In some alternate embodiments, system controller 1008 establishes a different quantity of trust domains in NetReach architecture 1000. For example, system controller 1008 may establish an additional trust domain (not shown) for use by guests of occupants of MDU building 1048.

Analogous to trust domains 744, 746, and 748 of FIG. 7, each trust domain 1058, 1060, and 1062 is a respective network segment of NetReach architecture 1000. Accordingly, each trust domain 1058, 1060, and 1062 allows its constituent devices to see each other, i.e., to be aware of the existence of each other and to potentially communicate with each other, as well as to communicate with the outside network 1006 and potentially with the Internet 120. However, absent special circumstances, devices in one trust domain 1058, 1060, and 1062 are not visible to devices in any other trust domain 1058, 1060, and 1062 due to each trust domain being a respective network segment of NetReach architecture 1000. For example, mobile phone 1044 and computer 1046 of trust domain 1062 may see each other and may communicate with outside network 1006 and potentially the Internet 120. However, mobile phone 1044 and computer 1046 of trust domain 1062 may not see mobile telephone 1038, computer 1040, and mobile phone 1042 of trust domain 1060, or vice versa.

Additionally, each trust domain 1058, 1060, and 1062 may implement one or more policies, such as on a trust domain basis and/or on a device basis. For example, one or more of trust domains 1058, 1060, and 1062 may implement one or more of the policies discussed above with respect to FIG. 7 on a trust domain basis and/or on a per device basis.

Analogous to trust domains 744, 746, and 748 of FIG. 7, trust domains 1058, 1060, and 1062 are access point agnostic, or stated differently, a device of any one of trust domains 1058, 1060, and 1062 could potentially be served by any one of wireless access points 1010, 1012, and 1014, or potentially even be simultaneously served by two or more wireless access points 1010, 1012, and 1014. Additionally, each wireless access point 1010, 1012, and 1014 can potentially serve any device in MDU building 1048, irrespective of which unit 1052, 1054, or 1056 the device is associated with. For example, the devices of trust domain 1058 are collectively supported by two wireless access points. Specifically, smart television 1032 is supported by wireless access point 1010 while range extender 1034 and mobile phone 1036 are supported by wireless access point 1012. In particular embodiments, the fact that devices of trust domain 1058 are supported by a plurality of access points is invisible to a user of the devices, or stated differently, it would appear to a user of the devices that the devices are served by a common wireless access point.

Additionally, a trust domain may include one or more devices served by CPE, instead of by a wireless access point. For example, trust domain 1062 includes computer 1046 served by CPE 1030, as well as mobile phone 1044 served by wireless access point 1014. In particular embodiments, devices of a given trust domain operate in the same manner with respect to NetReach architecture 1000 irrespective of whether they are served by a wireless access point or by CPE. For example, in some embodiments, mobile phone 1044 and computer 1046 have the same NetReach functionality even though the two devices are served by different types of network infrastructure, i.e., by a wireless access point and CPE, respectively. For example, mobile phone 1044 and computer 1046 may be associated with a common policy of trust domain 1062.

The fact that trust domains 1058, 1060, and 1062 are access point agnostic promotes wide and robust wireless coverage in NetReach architecture 1000 by enabling each device to be served by any wireless access point 1010, 1012, 1014 in a manner analogous to that discussed above with respect to NetReach architecture 700 of FIG. 7. Additionally, the fact that trust domains 1058, 1060, and 1062 are access point agnostic enables a device to be relocated to a different portion of MDU building 1048 while remaining within its respective trust domain and therefore continue to be covered by applicable per-device and/or per-trust domain policies. Accordingly, NetReach architecture 1000 supports seamless roaming of devices within MDU building 1048 and potentially in an area outside of MDU building 1048, such as on a patio (not shown) of MDU building 1048.

Figure 11:
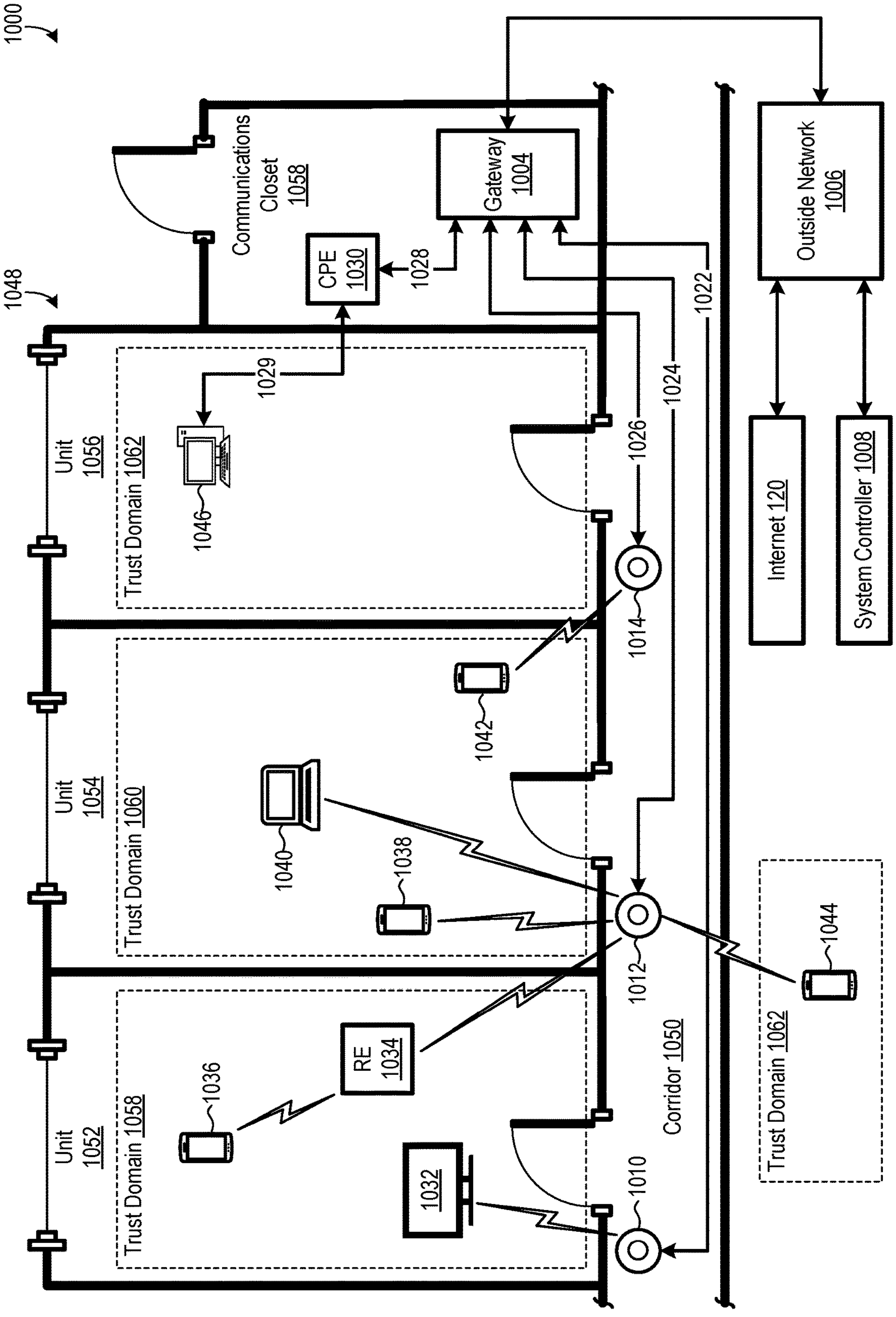
FIG. 11 illustrates the FIG. 10 NetReach architecture after a mobile phone has been moved.

For example, FIG. 11 is an illustration of NetReach architecture 1000 illustrating operation of NetReach architecture 1000 after mobile telephone 1044 has been moved from unit 1056 to outside of MDU building 1048. Mobile telephone 1044 is no longer within range of wireless access point 1014 in the scenario of FIG. 11. However, mobile telephone 1044 is within range of wireless access point 1012, and mobile telephone 1044 is therefore served by wireless access point 1012. Mobile telephone 1012 remains in trust domain 1062 even though it is outside of unit 1056 and is served by a different wireless access point than when it was located inside unit 1056. Accordingly, mobile phone 1012 continues to be capable of seeing, and potentially communicating with, other devices of trust domain 1062, e.g., computer 1046.

Referring again to FIG. 10, in particular embodiments, a party responsible for a given trust domain 1058, 1060, or 1062, e.g., an occupant of an unit associated with a given trust domain 1058, 1060, or 1062, can establish a trust domain, add devices to their trust domain, remove devices from their trust domain, set attributes of devices in their trust domain, in a manner similar to that of the NetReach architectures discussed above.

For example, in particular embodiments, an individual can use the following steps to obtain access to NetReach architecture 1000 and setup a respective trust domain. First, the individual buys a use card. The card includes a code that allows for network access for a period of time for a specific number of devices. The individual then accesses an existing network. The existing network can be a network associated with NetReach architecture 1000 or another network, such as an existing Wi-Fi network or a cellular network. The individual uses the existing network to access a portal for NetReach architecture 1000. The address of the portal can be provided on the purchased use card. The individual gets the code from the card. In some embodiments, the code is protected being behind a scratch-off portion of the use card. The individual enters the code into the portal. The portal then provisions for specific number of devices access to NetReach architecture 1000 using a trust domain 1058, 1060, or 1062. The individual can then load the NetReach application onto their device. The portal and/or system controller 1008 provide access information for the specific number of devices. The access information can include an SSID and password for each device. When a device connects to NetReach architecture 1000 via a wireless access point 1010, 1012, or 1014 using the provided SSID and password, the device is provided with a software defined network (SDN) and/or a virtual private network corresponding to the associated trust domain 1058, 1060, or 1062.

As another example, in some embodiments, when an individual wishes to add a new device to their trust domain, the individual may open a NetReach application on an existing device, such as their mobile phone or computer, and request a new credential, such as a password, for the new device. The NetReach application may then provide the individual a credential for the new device, and the individual may subsequently enter the credential on the new device, to add the new device to their trust domain. For example, assume that mobile telephone 1042 has not yet been added to trust domain 1060. An individual associated with trust domain 1060 may open a NetReach application on computer 1060, obtain a credential for mobile telephone 1042, and enter the credential on mobile telephone 1042, to add mobile telephone 1042 to trust domain 1060. It should be noted that the individual is able to add mobile phone 1042 to trust domain 1060 using computer 1040 even though mobile phone 1042 and computer 1040 are served by different respective wireless access points 1014 and 1012.

As an additional example, in certain embodiments, an individual can manage devices of their respective trust domain 1058, 1060, or 1062 via an NetReach application, irrespective of which wireless access point 1010, 1012, or 1014 the devices are served by, as well as irrespective of whether the devices are served by a wireless access point 1010, 1012, or 1014 or by CPE 1030. For example, an individual associated with trust domain 1060 may potentially set respective policies for each of mobile telephone 1038, computer 1040, and mobile phone 1042 via a NetReach application on mobile telephone 1038. Examples of possible policies include, but are not limited to, the per-device policies discussed above with respect to FIG. 7.

In particular embodiments, range extender 1034 is added to trust domain 1058 in the same manner as any other device in trust domain 1058, such as in the same manner as smart television 1032. Additionally, in some embodiments, range extender 1034 is configured to receive and forward wireless communication signals associated with its respective trust domain, i.e., trust domain 1058. For example, range extender 1034 may forward wireless communication signals between mobile telephone 1036 and wireless access point 1012 as illustrated in FIG. 10, in view of mobile telephone 1036 and range extender 1034 being members of a common trust domain, i.e., trust domain 1058. On the other hand, range extender 1034 will not forward wireless communication signals associated with mobile telephone 1038, even though mobile telephone 1038 is located near range extender 1034, because mobile telephone 1038 is a member of a different trust domain than range extender 1036.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., policies, usage categories, device settings, connectivity categories, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity and efficiency of computer networks and the devices on those networks at the server-side, and by further enabling the easier and more efficient identification of devices and network traffic at the server-side and the client-side. The present embodiments therefore improve the speed, efficiency, and reliability in which such determinations and processor analyses may be performed. Due to these improvements, the aspects described herein address computer-related issues that significantly improve the efficiency of transmitting messages in comparison with conventional techniques. Thus, the aspects herein may be seen to also address computer-related issues such as dynamic network settings for different devices on network between electronic computing devices or systems, for example.

Exemplary embodiments of systems and methods for category based network device and traffic identification and routing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for selectively limiting communication bandwidth in a communication environment including at least a first wireless access point, the method comprising:

serving, using the first wireless access point, at least a first trust domain and a second trust domain;

receiving, from the first wireless access point, a first load information message, the first load information message indicating at least (i) collective egress data bitrate of all devices of the first trust domain being served by the first wireless access point and (ii) collective egress data bitrate of all devices of the second trust domain being served by the first wireless access point;

determining, from the first load information message, that a data transmission bandwidth limit is needed by the first wireless access point;

in response to determining that the data transmission bandwidth limit is needed by the first wireless access point, generating a first data transmission bandwidth limit; and sending the first data transmission bandwidth limit to the first wireless access point.

2. The method of claim 1, wherein the first data transmission bandwidth limit applies solely to data transmission between the first wireless access point and a single device.

3. The method of claim 1, wherein the first data transmission bandwidth limit applies solely to data transmission between the first wireless access point and the devices of the first trust domain being served by the first wireless access point.

4. The method of claim 1, wherein:

the communication environment further includes a second wireless access point; and each of the first wireless access point and the second wireless access point is communicatively coupled to a network element of the communication environment by a respective communication link that provides a dedicated data egress and ingress path for the wireless access point.

5. The method of claim 4, wherein the network element of the communication environment comprises a gateway.

6. The method of claim 1, wherein the first wireless access point is capable of exchanging data with a network element of the communication environment without the data passing through another wireless access point of the communication environment.

7. The method of claim 6, wherein the network element of the communication environment comprises a gateway.

8. The method of claim 1, wherein determining that the data transmission bandwidth limit is needed by the first wireless access point comprises determining that the data transmission bandwidth limit is needed in response to a communication link operating within a predetermined proximity to a maximum data transmission capacity of the communication link, the communication link communicatively coupling the first wireless access point to a network element of the communication environment.

9. The method of claim 1, wherein the first load information message further indicates at least a respective data transmission rate for each device being served by the first wireless access point.

10. A communication environment, comprising:

a first wireless access point communicatively coupled to a network element of the communication environment by a first communication link, the first wireless access point being configured to serve at least a first trust domain and a second trust domain;

a second wireless access point communicatively coupled to the network element of the communication environment by a second communication link; and a system controller configured to, in response to receipt of a first load information message from the first wireless access point, cause the first wireless access point to limit bandwidth of a first data transmission between the first wireless access point and a first device without limiting bandwidth of a second data transmission between the first wireless access point and a second device, the first load information message indicating at least (i) collective egress data bitrate of all devices of the first trust domain being served by the first wireless access point and (ii) collective egress data bitrate of all devices of the second trust domain being served by the first wireless access point.

11. The communication environment of claim 10, wherein:

the first device is part of the first trust domain; and the second device is part of the second trust domain.

* * * * *